US012300865B2

(12) United States Patent
Zhang et al.

(10) Patent No.: US 12,300,865 B2
(45) Date of Patent: May 13, 2025

(54) METHOD FOR ASSEMBLING BIPOLAR PLATE BY INTEGRAL MISALIGNMENT, A FUEL CELL STACK WITH THE BIPOLAR PLATE AND A POWER GENERATION SYSTEM

(71) Applicants: Guosheng Zhang, Beijing (CN); Zhijin Zhang, Beijing (CN); Ruiping Niu, Beijing (CN); Wenming Zhang, Jiaozuo (CN)

(72) Inventors: Guosheng Zhang, Beijing (CN); Zhijin Zhang, Beijing (CN)

(73) Assignees: Guosheng Zhang, Beijing (CN); Zhijin Zhang, Beijing (CN); Ruiping Niu, Beijing (CN); Wenming Zhang, Jiaozuo (CN)

( * ) Notice: Subject to any disclaimer, the term of this patent is extended or adjusted under 35 U.S.C. 154(b) by 788 days.

(21) Appl. No.: 17/438,946

(22) PCT Filed: Oct. 22, 2020

(86) PCT No.: PCT/CN2020/122692
§ 371 (c)(1),
(2) Date: Sep. 14, 2021

(87) PCT Pub. No.: WO2021/114887
PCT Pub. Date: Jun. 17, 2021

(65) Prior Publication Data
US 2022/0158217 A1    May 19, 2022

(30) Foreign Application Priority Data
Dec. 10, 2019  (CN) .......................... 201911255215.7

(51) Int. Cl.
*H01M 8/2404*   (2016.01)
*H01M 8/0258*   (2016.01)
*H01M 8/0267*   (2016.01)

(52) U.S. Cl.
CPC ....... *H01M 8/2404* (2016.02); *H01M 8/0258* (2013.01); *H01M 8/0267* (2013.01)

(58) Field of Classification Search
CPC . H01M 8/0258; H01M 8/0267; H01M 8/2404
See application file for complete search history.

(56) References Cited

U.S. PATENT DOCUMENTS

2008/0090129 A1\*  4/2008  Kunz ................... H01M 8/086
                                                    429/510
2019/0214658 A1    7/2019  Zhang et al.

FOREIGN PATENT DOCUMENTS

CN    106207235 A       12/2016
CN    108511774 A   \*   9/2018   .......... H01M 8/0258
(Continued)

OTHER PUBLICATIONS

CN-108511774-A English machine translation (Year: 2024).\*
CN 108511774A English machine translation2 (Year: 2024).\*

*Primary Examiner* — Armindo Carvalho, Jr.
(74) *Attorney, Agent, or Firm* — Bayramoglu Law Offices LLC

(57) ABSTRACT

A method for assembling a bipolar plate by integral misalignment, a fuel cell stack with the bipolar plate and a power generation system are provided. The misalignment mode includes: misaligning the centers of mass and misaligning the centers of flow fields. The method can form a large-area synchronous undulation area or simultaneously form a plurality of synchronous undulation areas on the bipolar plate without changing a flow channel spacing. In the fuel cell stack, by the means that the bipolar plate is rotated 180° around an axis parallel to a thickness direction of the (Continued)

bipolar plate or rotated 180° around an axis parallel to a misalignment direction, the MEA is prevented from wrinkling, so as to avoid the blockage of a reactant flow channel and poor contact of a circuit.

7 Claims, 22 Drawing Sheets

(56) References Cited

FOREIGN PATENT DOCUMENTS

| | | |
|---|---|---|
| CN | 110112434 A | 8/2019 |
| CN | 110492126 A | 11/2019 |
| CN | 110931820 A | 3/2020 |
| CN | 111477903 A | 7/2020 |
| DE | 102014206336 A1 | 10/2015 |

* cited by examiner

METHOD FOR ASSEMBLING BIPOLAR PLATE BY INTEGRAL MISALIGNMENT, A FUEL CELL STACK WITH THE BIPOLAR PLATE AND A POWER GENERATION SYSTEM

CROSS REFERENCE TO THE RELATED APPLICATIONS

This application is the national phase entry of International Application No. PCT/CN2020/122692, filed on Oct. 22, 2020, which is based upon and claims priority to Chinese Patent Application No. 201911255215.7, filed on Dec. 10, 2019, the entire contents of which are incorporated herein by reference.

TECHNICAL FIELD

The present disclosure belongs to the technical field of fuel cells, and in particular, relates to a method for assembling a bipolar plate of a fuel cell stack by integral misalignment, a fuel cell stack with the bipolar plate fabricated by the method and a power generation system.

BACKGROUND

A fuel cell is an electrochemical reaction device capable of converting chemical energy into electrical energy. Fuel cells are popular in the military and civilian fields due to their advantages such as high energy conversion efficiency, zero emissions and low mechanical noise. The proton exchange membrane fuel cell (PEMFC) uses a solid polymer membrane as the electrolyte, and thus has the advantages of simple structure and low operating temperature. Therefore, PEMFCs are granted an exceptional edge in mobile power sources.

In order to improve the total generated power of the fuel cell, a plurality of individual cells are typically connected in series to form a fuel cell stack. The bipolar plate is one of the critical components of fuel cell stacks, as it can realize a variety of functions in the fuel cell stack, such as supporting the membrane electrode assembly (MEA), distributing the reaction gas, transmitting current, conducting heat and discharging the reaction product, i.e., water. At the current technical level, the manufacturing cost of the bipolar plate accounts for about half of the total manufacturing cost of the entire fuel cell stack.

When used as a mobile power source, the PEMFC stack preferably uses metal bipolar plates to obtain enhanced shock resistance. The cathode plate and the anode plate forming the metal bipolar plate are made of thin metal plates by pressure processing, and thus are corrugated, which imposes great limitations to the design of the coolant flow path. The structural design of metal bipolar plates presents a difficult problem on how to introduce and discharge the coolant in each coolant flow channel between the cathode plate and the anode plate without increasing the thickness of the bipolar plate, reducing the depth of the reactant flow channel or adding an accessory.

In the previous research work of the inventors, the problem of introducing and discharging the coolant mentioned above has been solved by forming a misalignment area or a synchronous undulation area on the bipolar plate, as disclosed in Chinese patents No. 201810373488.0 and No. 201910851949.5 and U.S. patent Ser. No. 16/231,950). The misalignment area and the synchronous undulation area are similar in their configurations. They are both a specific region on the bipolar plate, and in this region, the coolant flow channels of the cathode plate and the anode plate are interlaced with each other, and a connected coolant flow passage with a wavy cross-section is formed. At present, the research on the formation of the misalignment area and the synchronous undulation area is not complete yet, especially the research on the formation of the synchronous undulation area on the bipolar plate used in the air-cooled stack and the long and narrow bipolar plate remains absent.

SUMMARY

An objective of the present disclosure is to provide a method for assembling a bipolar plate by integral misalignment. The method of the present disclosure can form a large-area synchronous undulation area or simultaneously form a plurality of synchronous undulation areas on the bipolar plate without changing a flow channel spacing. In a fuel cell stack, the synchronous undulation area can be used as a passage through each coolant flow channel between a cathode plate and an anode plate. With the help of the synchronous undulation area, a coolant can be introduced into and discharged out of each coolant flow channel between the cathode plate and the anode plate without increasing the thickness of the bipolar plate, reducing a depth of a reactant flow channel or adding an accessory.

Another objective of the present disclosure is to provide a fuel cell stack with the bipolar plate fabricated by the above method and a power generation system using the fuel cell stack. In the fuel cell stack with the bipolar plate fabricated by the above method, the membrane electrode assembly (MEA) is prevented from wrinkling in a position corresponding to the synchronous undulation area by the means that the bipolar plate is rotated 180° around an axis parallel to a thickness direction of the bipolar plate or around an axis parallel to a misalignment direction.

To achieve the above objective, the present disclosure adopts the following technical solution.

A method for assembling a bipolar plate by integral misalignment includes the following steps:

step 1: fabricating a first polar plate and a second polar plate, where the first polar plate is provided with a first side and a second side; the first side is provided with a first flow channel and a first reference plane; the second side is provided with a second flow channel and a second reference plane; the first flow channel is a groove formed in a thickness direction of the first polar plate relative to the first reference plane; the second flow channel is a groove formed in a thickness direction of the first polar plate relative to the second reference plane; the back of the bottom of the first flow channel is a part of the second reference plane, and the back of the bottom of the second flow channel is a part of the first reference plane; the thickness directions of the first polar plate are two opposite directions perpendicular to the first reference plane;

the second polar plate is provided with a third side and a fourth side; the third side is provided with a third flow channel and a third reference plane; the fourth side is provided with a fourth flow channel and a fourth reference plane; the third flow channel is a groove formed in a thickness direction of the second polar plate relative to the third reference plane; the fourth flow channel is a groove formed in a thickness direction of the second polar plate relative to the fourth reference plane; the back of the bottom of the third flow channel is a part of the fourth reference plane, and the back of the bottom of the fourth flow channel is a part of the third reference plane; the thickness directions of the second polar plate are two opposite directions perpendicular to the third reference plane; and step 2: combining the first polar plate and the second polar plate in the following manner:

the second side of the first polar plate is attached to the fourth side of the second polar plate, such that a part of the second reference plane is in contact with a part of the fourth reference plane, and a center of mass of the first polar plate is misaligned with a center of mass of the second polar plate; a distance between a projection of the center of mass of the first polar plate in a fifth reference plane and a projection of the center of mass of the second polar plate in the fifth reference plane is d, d>w/2, where, w represents a width of the first flow channel at a depth that is half of a total depth of the first flow channel; the fifth reference plane is a virtual projection plane perpendicular to a thickness direction of the bipolar plate; the thickness direction of the bipolar plate is consistent with the thickness direction of the first polar plate on the bipolar plate; a misalignment direction is defined as being parallel to a line connecting the projection of the center of mass of the first polar plate in the fifth reference plane and the projection of the center of mass of the second polar plate in the fifth reference plane.

Further, in step 2, due to the misalignment of the center of mass of the first polar plate and the center of mass of the second polar plate, there may be at least one synchronous undulation area on the bipolar plate; the synchronous undulation area is a region on the bipolar plate, and a smallest dimension of the synchronous undulation area in the misalignment direction may be larger than 2.5 times of w; the synchronous undulation area may include a part of the first flow channel, the first reference plane, the second flow channel, the second reference plane, the third flow channel, the third reference plane, the fourth flow channel and the fourth reference plane; this part of the second reference plane may be not in contact with this part of the fourth reference plane; an angle between the first flow channel in the synchronous undulation area and the misalignment direction may range from 60° to 120°, and an angle between the third flow channel in the synchronous undulation area and the misalignment direction may range from 60° to 120°.

Further, after step 2, the method may further include step 3: fixedly connecting the first polar plate to the second polar plate.

A method for assembling a bipolar plate by integral misalignment includes the following steps:

step 1: fabricating a first polar plate and a second polar plate, where the first polar plate is provided with a first side and a second side; the first side is provided with a first flow channel and a first reference plane; the second side is provided with a second flow channel and a second reference plane; the first flow channel is a groove formed in a thickness direction of the first polar plate relative to the first reference plane; the second flow channel is a groove formed in a thickness direction of the first polar plate relative to the second reference plane; the back of the bottom of the first flow channel is a part of the second reference plane, and the back of the bottom of the second flow channel is a part of the first reference plane; the thickness directions of the first polar plate are two opposite directions perpendicular to the first reference plane; the first side of the first polar plate is provided with a plurality of the first flow channels, the first polar plate is provided with a center of a first side flow field, and the first flow channels on the first side are symmetrically arranged with the center of the first side flow field as a symmetry point;

the second polar plate is provided with a third side and a fourth side; the third side is provided with a third flow channel and a third reference plane; the fourth side is provided with a fourth flow channel and a fourth reference plane; the third flow channel is a groove formed in a thickness direction of the second polar plate relative to the third reference plane; the fourth flow channel is a groove formed in a thickness direction of the second polar plate relative to the fourth reference plane; the back of the bottom of the third flow channel is a part of the fourth reference plane, and the back of the bottom of the fourth flow channel is a part of the third reference plane; the thickness directions of the second polar plate are two opposite directions perpendicular to the third reference plane; the third side of the second polar plate is provided with a plurality of the third flow channels, the second polar plate is provided with a center of a third side flow field, and the third flow channels on the third side are symmetrically arranged with the center of the third side flow field as a symmetry point; and step 2: combining the first polar plate and the second polar plate in the following manner:

the second side of the first polar plate is attached to the fourth side of the second polar plate, such that a part of the second reference plane is in contact with a part of the fourth reference plane, and the center of the first side flow field is misaligned with the center of the third side flow field; a distance between a projection of the center of the first side flow field in a fifth reference plane and a projection of the center of the third side flow field in the fifth reference plane is δ, w/2<δ<2w, where, w represents a width of the first flow channel at a depth that is half of a total depth of the first flow channel; the fifth reference plane is a virtual projection plane perpendicular to a thickness direction of the bipolar plate; the thickness direction of the bipolar plate is consistent with the thickness direction of the first polar plate on the bipolar plate; a misalignment direction is defined as being parallel to a line connecting the projection of the center of the first side flow field in the fifth reference plane and the projection of the center of the third side flow field in the fifth reference plane.

Further, in step 2, due to the misalignment of the center of the first side flow field and the center of the third side flow field, there may be at least one synchronous undulation area on the bipolar plate; the synchronous undulation area is a region on the bipolar plate, and a smallest dimension of the synchronous undulation area in the misalignment direction may be larger than 2.5 times of w; the synchronous undulation area may include a part of the first flow channel, the first reference plane, the second flow channel, the second reference plane, the third flow channel, the third reference plane, the fourth flow channel and the fourth reference plane; this part of the second reference plane may be not in contact with this part of the fourth reference plane; an angle between the first flow channel in the synchronous undulation area and the misalignment area may range from 60° to 120°, and an angle between the third flow channel in the synchronous undulation area and the misalignment direction may range from 60° to 120°.

Further, after step 2, the method may further include step 3: fixedly connecting the first polar plate to the second polar plate.

Further, on the first polar plate fabricated in step 1, the projections of the center of the first side flow field and the center of mass of the first polar plate in the fifth reference plane may overlap; on the second polar plate fabricated in step 1, the projections of the center of the third side flow field and the center of mass of the second polar plate in the fifth reference plane may not overlap, and may have a distance that is equal to δ; in step 2, the projection of the center of mass of the first polar plate in the fifth reference plane may overlap with the projection of the center of mass of the second polar plate in the fifth reference plane.

Further, on the first polar plate fabricated in step 1, the projections of the center of the first side flow field and the center of mass of the first polar plate in the fifth reference plane may not overlap, and may have a distance that is equal to half of δ; on the second polar plate fabricated in step 1, the projections of the center of the third side flow field and the center of mass of the second polar plate in the fifth reference plane may not overlap, and may have a distance that is equal to half of δ; in step 2, the projection of the center of mass of the first polar plate in the fifth reference plane may overlap with the projection of the center of mass of the second polar plate in the fifth reference plane.

Further, the first polar plate and the second polar plate fabricated in step 1 may have the same geometric shape; the first side of the first polar plate may be the same as the third side of the second polar plate, and the second side of the first polar plate may be the same as the fourth side of the second polar plate; the first polar plate and the second polar plate may be separately provided with a fuel inlet channel, a fuel outlet channel, an oxidant inlet channel and an oxidant outlet channel; after the step of fixedly connecting the first polar plate to the second polar plate, the method may further include the following step: cutting an edge of the oxidant inlet channel and an edge of the oxidant outlet channel, or filling a cover plate in the fuel inlet channel and the fuel outlet channel, such that a cross-sectional area of the oxidant inlet channel is larger than a cross-sectional area of the fuel inlet channel and a cross-sectional area of the fuel outlet channel, and a cross-sectional area of the oxidant outlet channel is larger than the cross-sectional area of the fuel inlet channel and the cross-sectional area of the fuel outlet channel.

Further, the first polar plate and the second polar plate fabricated in step 1 may be provided with positioning devices for misalignment assembly, respectively; the positioning devices may be symmetrical with a centerline of the bipolar plate as a symmetry axis, wherein the centerline of the bipolar plate is parallel to the misalignment direction; in step 2, the positioning devices may be used to determine relative positions of the first polar plate and the second polar plate.

Further, the first polar plate and the second polar plate fabricated in step 1 may be not provided with a coolant inlet channel and a coolant outlet channel; on the first polar plate there may be a plurality of parallel straight-through first flow channels and a transverse flow channel formed by cutting ribs between the first flow channels; the back of the transverse flow channel formed by cutting the ribs between the first flow channels may be the second reference plane that is formed by blocking the second flow channel and plays a role in supporting; the second polar plate has the same shape as the first polar plate.

Further, the first polar plate and the second polar plate fabricated in step 1 may be not provided with a coolant inlet channel and a coolant outlet channel; on the first polar plate there may be a plurality of parallel straight-through first flow channels and a transverse flow channel formed by cutting ribs between the first flow channels; the back of the transverse flow channel formed by cutting the ribs between the first flow channels may be the second reference plane that is formed by blocking the second flow channel and plays a role in supporting; the second polar plate may be a serpentine flow field plate.

Further, the first polar plate and the second polar plate fabricated in step 1 may be respectively provided with a coolant inlet channel and a coolant outlet channel; the first polar plate may be a Z-shaped flow field plate, and the first flow channel and the second flow channel may be Z-shaped flow channels; the second polar plate and the first polar plate may have the same geometric shape.

Further, the first polar plate and the second polar plate fabricated in step 1 may be respectively provided with a coolant inlet channel and a coolant outlet channel; the first polar plate may be a Z-shaped flow field plate, and the first flow channel and the second flow channel may be Z-shaped flow channels; the second polar plate may be a serpentine flow field plate; the third flow channel and the fourth flow channel may be serpentine flow channels, and an end of the serpentine flow channel may be bent at 90° and may be located on a side of the second polar plate.

Further, a top width of each of the first flow channel, the second flow channel, the third flow channel and the fourth flow channel on the first polar plate and the second polar plate fabricated in step 1 may be larger than a bottom width thereof; cross-sections of the first flow channel, the second flow channel, the third flow channel and the fourth flow channel may be isosceles trapezoids; an upper support platform may be provided on the first polar plate; the upper support platform may be a part of the second reference plane formed by blocking a part of the second flow channel; in step 2, the upper support platform may be in the synchronous undulation area, and may be in contact with a part of the fourth reference plane in the synchronous undulation area; a lower support platform may be provided on the second polar plate; the lower support platform may be a part of the fourth reference plane formed by blocking a part of the fourth flow channel; in step 2, the lower support platform may be in the synchronous undulation area, and may be in contact with a part of the second reference plane in the synchronous undulation area.

A fuel cell stack includes the bipolar plate fabricated by the method.

In an embodiment, the fuel cell stack may include at least three bipolar plates fabricated by the method;

in the fuel cell stack, the first flow channel of the first polar plate of each bipolar plate may be a fuel flow channel, and the third flow channel of the second polar plate of each bipolar plate may be an oxidant flow channel; for a first polar plate and a second polar plate that clamp the same MEA and belong to two different bipolar plates, the projection of the center of mass of the first polar plate in the sixth reference plane and the projection of the center of mass of the second polar plate in the sixth reference plane may overlap or have a distance smaller than d; for two spaced-apart bipolar plates, the projections of the centers of mass of the two first polar plates in the sixth reference plane may overlap or have a distance smaller than d, and the projections of the centers of mass of the two second polar plates in the sixth reference plane may overlap or have a distance smaller than d; two MEAS and one bipolar plate are sandwiched between the two spaced-apart bipolar plates; the sixth reference plane is a virtual projection plane perpendicular to the thickness directions of the at least three bipolar plates; when the bipolar plates are assembled into the fuel cell stack, one of two bipolar plates clamping the same MEA may be rotated 180° relative to the other around an axis parallel to the thickness direction of the bipolar plate or around an axis parallel to the misalignment direction.

In an embodiment, the fuel cell stack may include at least three bipolar plates fabricated by the method;

in the fuel cell stack, the first flow channel of the first polar plate of each bipolar plate may be a fuel flow channel, and the third flow channel of the second polar plate of each bipolar plate may be an oxidant flow channel; for a first polar plate and a second polar plate that clamp the same MEA and belong to two different bipolar plates, the projection of the center of the first side flow field of the first polar plate in the sixth reference plane and the projection of the center of the third side flow field of the second polar plate in the sixth reference plane may overlap or have a distance smaller than δ; for two spaced-apart bipolar plates, the projections of the centers of the first side flow fields of the two first polar plates in the sixth reference plane may overlap or have a distance smaller than δ, and the projections of the centers of the third side flow fields of the two second polar plates in the sixth reference plane may overlap or have a distance smaller than δ; two MEAs and one bipolar plate are sandwiched between the two spaced-apart bipolar plates; the sixth reference plane is a virtual projection plane perpendicular to the thickness directions of the at least three bipolar plates; when the bipolar plates are assembled into the fuel cell stack, one of two bipolar plates clamping the same MEA may be rotated 180° relative to the other around an axis parallel to the thickness direction of the bipolar plate or around an axis parallel to the misalignment direction.

Further, the first polar plate and the second polar plate of the bipolar plate may have the same geometric shape; the first polar plate and the second polar plate may be separately provided with a fuel inlet channel, a fuel outlet channel, an oxidant inlet channel and an oxidant outlet channel;

the fuel cell stack may include a fuel inlet channel filling rod or a fuel inlet channel filling plate; the fuel inlet channel filling rod or the fuel inlet channel filling plate may be placed in the fuel inlet channel to reduce the cross-sectional area of the fuel inlet channel;

the fuel cell stack may further include a fuel outlet channel filling rod or a fuel outlet channel filling plate; the fuel outlet channel filling rod or the fuel outlet channel filling plate may be placed in the fuel outlet channel to reduce the cross-sectional area of the fuel outlet channel.

A fuel cell power generation system includes the fuel cell stack.

The present disclosure has the following beneficial effects. The method for assembling a bipolar plate by integral misalignment provided by the present disclosure can form a large-area synchronous undulation area or synchronously form a plurality of synchronous undulation areas on the bipolar plate without changing a flow channel spacing. Compared with the method of forming a misalignment area or a synchronous undulation area by changing the flow channel spacing, the method of the present disclosure simplifies the flow field and the structure of the bipolar plate. With the help of the synchronous undulation area, a coolant can be introduced into and discharged out of each coolant flow channel between a cathode plate and an anode plate, and can flow through an entire reaction area, without increasing the thickness of the bipolar plate, reducing the depth of the reactant flow channel or adding an accessory. The present disclosure is beneficial to improve the power density and temperature control ability of the fuel cell stack.

DETAILED DESCRIPTION OF THE EMBODIMENTS

Figure 1:
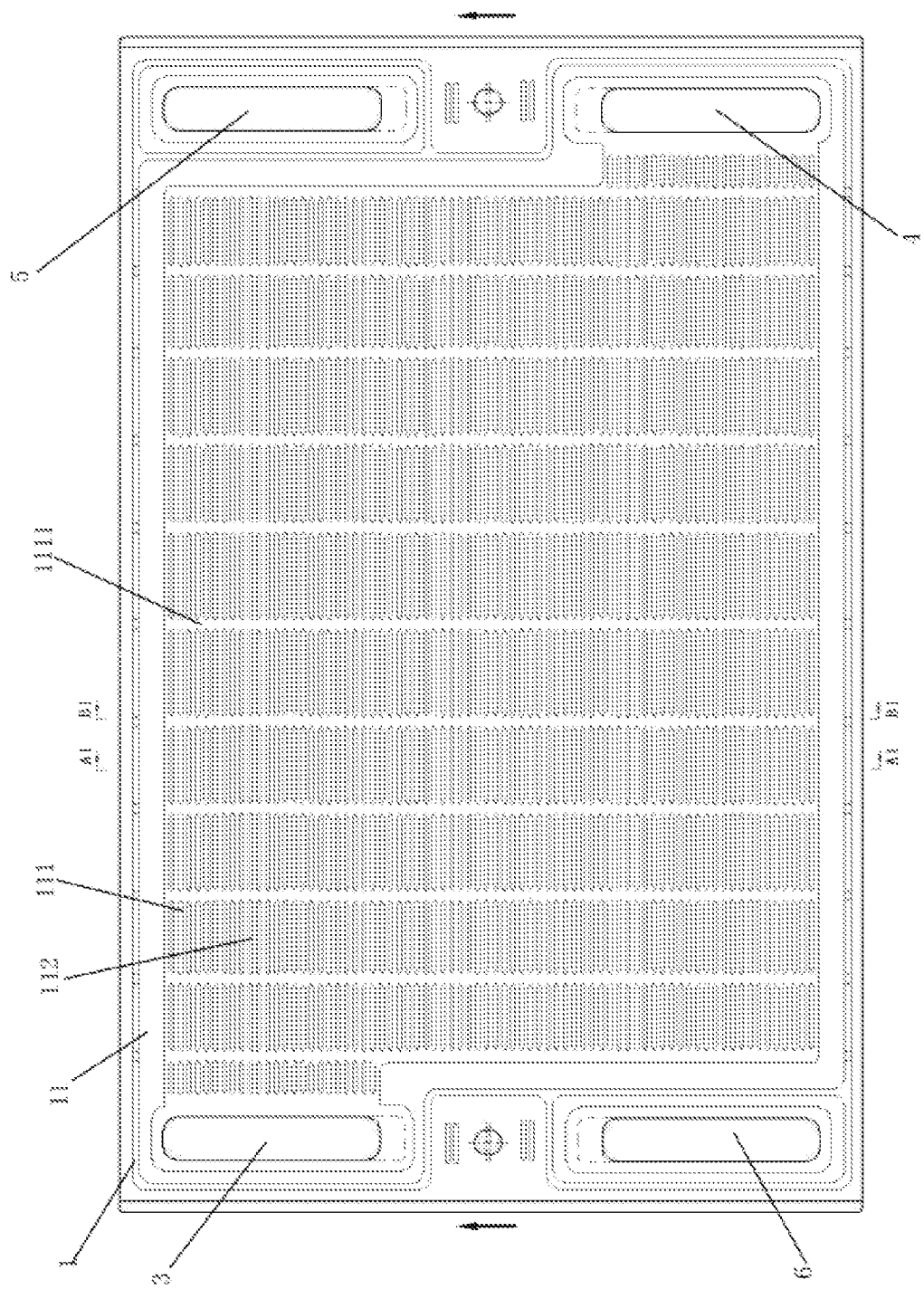
FIG. 1 is a structural schematic diagram of a bipolar plate in Embodiment 1 of a method for assembling a bipolar plate by integral misalignment according to the present disclosure.
Figure 1A:
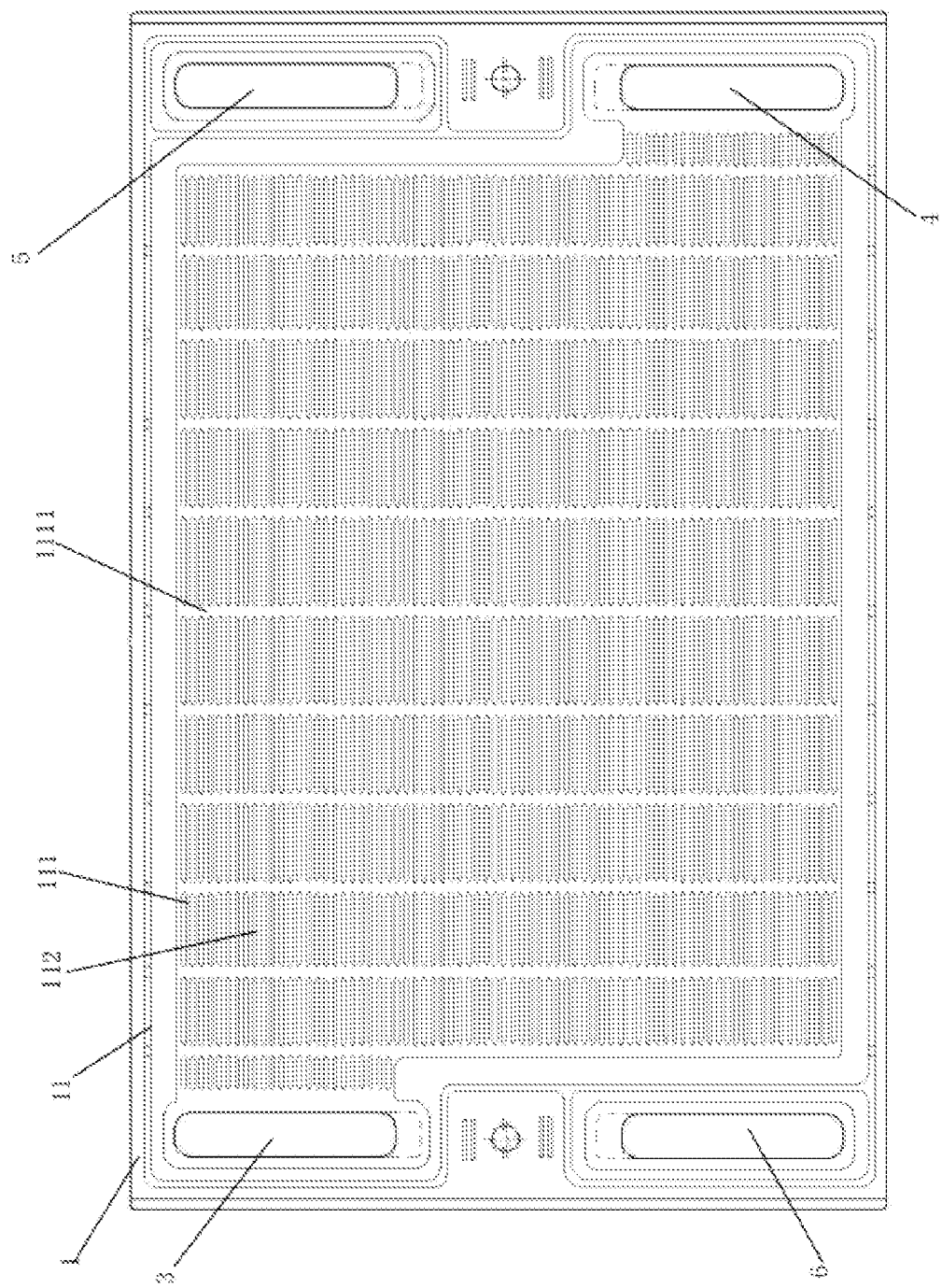
FIG. 1A is a structural schematic diagram of a first polar plate in Embodiment 1 of the method for assembling a bipolar plate by integral misalignment according to the present disclosure.
Figure 1B:
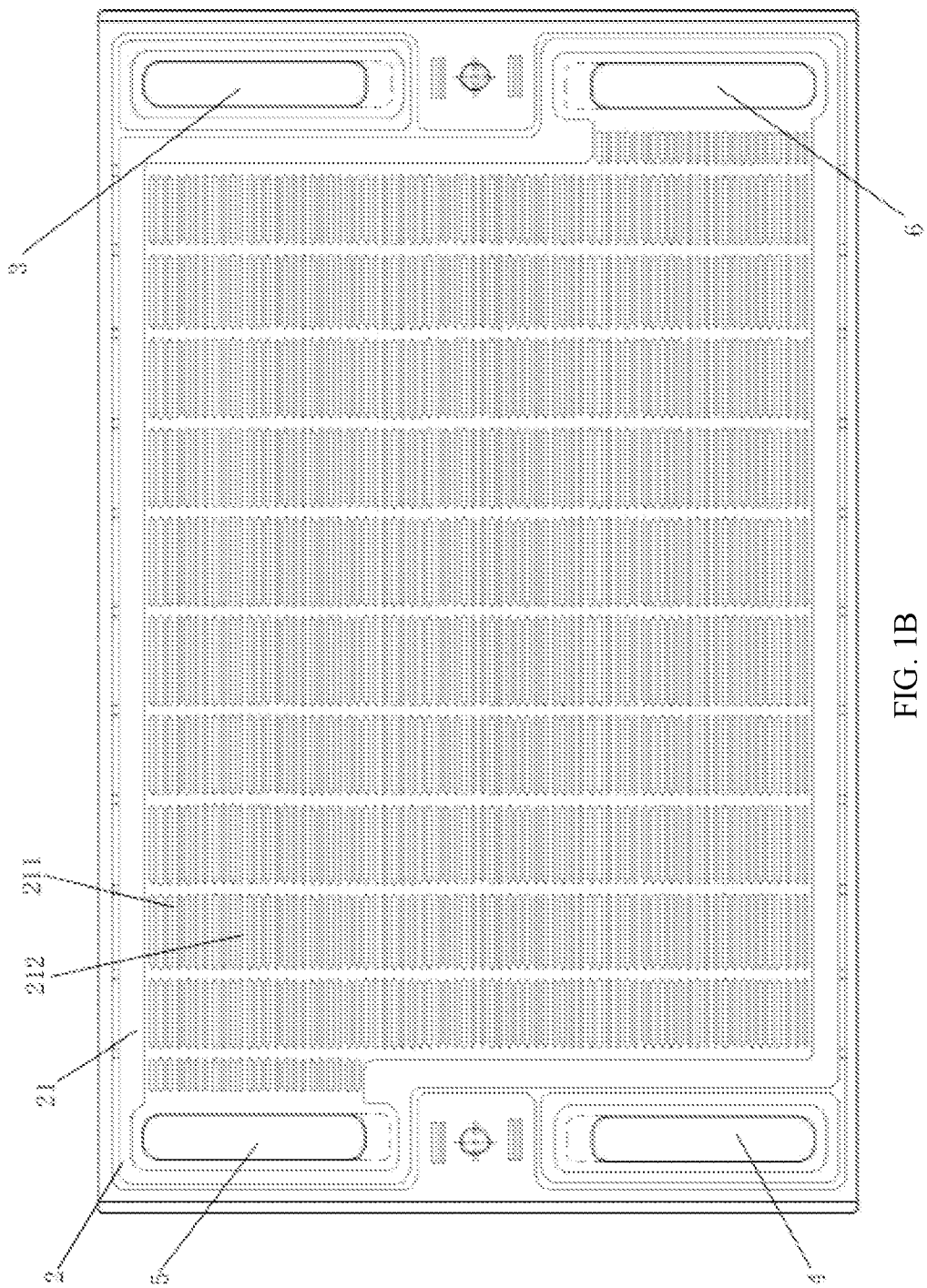
FIG. 1B is a structural schematic diagram of a second polar plate in Embodiment 1 of the method for assembling a bipolar plate by integral misalignment according to the present disclosure.

The present disclosure is described in further detail below in combination with the accompanying drawings and specific embodiments so as to help those skilled in the art to better understand and implement the present disclosure. The illustrated embodiments should not be construed as any limitation to the present disclosure.

The present disclosure provides a bipolar plate. As shown in FIGS. 1 to 5, the bipolar plate in each of Embodiments 1 to 4 includes a first polar plate 1 and a second polar plate 2. The first polar plate 1 is provided with a first side 11 and a second side 12. The first side 11 is provided with first flow channels 111 and a first reference plane 112. The second side 12 is provided with second flow channels 121 and a second reference plane 122. The first flow channel 111 is a groove formed in a thickness direction of the first polar plate relative to the first reference plane 112. The second flow channel 121 is a groove formed in a thickness direction of the first polar plate relative to the second reference plane 122. The thickness directions of the first polar plate are two opposite directions perpendicular to the first reference plane 112. The back of the bottom of the first flow channel 111 is the second reference plane 122, and the back of the bottom of the second flow channel 121 is the first reference plane 112. The second polar plate 2 is provided with a third side 21 and a fourth side 22. The third side 21 is provided with third flow channels 211 and a third reference plane 212. The fourth side 22 is provided with fourth flow channels 221 and a fourth reference plane 222. The third flow channel 211 is a groove formed in a thickness direction of the second polar plate relative to the third reference plane 212. The fourth flow channel 221 is a groove formed in a thickness direction of the second polar plate relative to the fourth reference plane 222. The thickness directions of the second polar plate are two opposite directions perpendicular to the third reference plane 212. The back of the bottom of the third flow channel 211 is the fourth reference plane 222, and the back of the bottom of the fourth flow channel 221 is the third reference plane 212. The second side 12 of the first polar plate 1 is attached to the fourth side 22 of the second polar plate 2 to form the bipolar plate.

The present disclosure provides a method for assembling a bipolar plate by integral misalignment, which is referred to as Method 1 below. It includes the following steps:

Step 1: Fabricate the first polar plate 1 and the second polar plate 2 of the bipolar plate in Embodiments 1 to 4. In a preferred method, a metal or alloy sheet with a thickness of about 0.1 mm is cut into a predetermined shape and then placed in a mold for stamping. A concave-convex structure in the mold corresponds to a concave-convex structure of the first polar plate and the second polar plate. The first polar plate 1 and the second polar plate 2 are corrugated. The back of the bottom of the first flow channel 111 is a part of the second reference plane 122, the back of the bottom of the second flow channel 121 is a part of the first reference plane 112, the back of the bottom of the third flow channel 211 is a part of the fourth reference plane 222, and the back of the bottom of the fourth flow channel 221 is a part of the third reference plane 212. A top width of each of the first flow channel 111, the second flow channel 121, the third flow channel 211 and the fourth flow channel 221 is larger than a bottom width thereof. Cross-sections of the first flow channel 111, the second flow channel 121, the third flow channel 211 and the fourth flow channel 221 are identical and are isosceles trapezoids. The first reference plane 112 and the second reference plane 122 are planes parallel to each other, and the third reference plane 212 and the fourth reference plane 222 are planes parallel to each other.

Step 2: Combine the first polar plate 1 and the second polar plate 2 into the bipolar plate.

As shown in FIGS. 6A, 7, 8A and 9, the second side 12 of the first polar plate 1 is attached to the fourth side 22 of the second polar plate 2, such that a part of the second reference plane is in contact with a part of the fourth reference plane, and a center of mass of the first polar plate 1 is misaligned with a center of mass of the second polar plate 2. A distance between a projection of the center of mass of the first polar plate 1 in a fifth reference plane and a projection of the center of mass of the second polar plate 2 in the fifth reference plane is d, d>w/2, where w represents a width of the first flow channel at a depth that is half of a total depth of the first flow channel. The fifth reference plane is a virtual projection plane perpendicular to a thickness direction of the bipolar plate. The thickness direction of the bipolar plate is consistent with the thickness direction of the first polar plate on the bipolar plate. A misalignment direction is defined as being parallel to a line connecting the projection of the center of mass of the first polar plate in the fifth reference plane and the projection of the center of mass of the second polar plate in the fifth reference plane. The center of mass of the first polar plate is a fixed point on the first polar plate, that is, a center of gravity of the first polar plate, and the center of mass of the second polar plate is a fixed point on the second polar plate, that is, a center of gravity of the second polar plate. Therefore, it is not necessary to determine the specific positions of the center of mass of the first polar plate and the center of mass of the second polar plate during misalignment assembly. It only needs to perform the misalignment assembly of the two polar plates by means of positioning devices on the first polar plate and the second polar plate. The positioning devices are designed as two slits with a distance of d or two circular holes with a distance of d between two circle centers and partially overlapping. With the help of the positioning devices, the centers of mass of the two polar plates can be misaligned by a distance of d without measuring the specific positions of the centers of mass.

Further, in Step 2 of Method 1, due to the misalignment of the center of mass of the first polar plate 1 and the center of mass of the second polar plate 2, there is a synchronous undulation area on the bipolar plate. The synchronous undulation area on the bipolar plate has a smallest dimension in the misalignment direction, which is larger than 2.5 times of w. The synchronous undulation area includes a part of each of the first flow channel 111, the first reference plane 112, the second flow channel 121, the second reference plane 122, the third flow channel 211, the third reference plane 212, the fourth flow channel 221 and the fourth reference plane 222. This part of the second reference plane 122 is not in contact with this part of the fourth reference plane 222. An angle between the first flow channel 111 in the synchronous undulation area and the misalignment direction ranges from 60° to 120°, and an angle between the third flow channel 211 in the synchronous undulation area and the misalignment direction ranges from 60° to 120°. As the simplest and most feasible solution, the misalignment direction is kept perpendicular to the first flow channel and the third flow channel in the synchronous undulation area. At this time, an optimal misalignment amount of the two polar plates is: $d^*=w/2+w'/2+t$, where w represents a width of the first flow channel at a depth that is half of a total depth of the first flow channel; w' represents a width of the second flow channel at a depth that is half of a total depth of the second flow channel; t represents a thickness of a body of the first polar plate.

In addition, as shown in FIGS. 3, 3A, 3B and 4, in order to prevent the flow of a coolant in the synchronous undulation area from being blocked by deformation due to the compression of upper and lower bipolar plates, a plurality of upper support platforms U are provided at a position of the first polar plate corresponding to the synchronous undulation area. The upper support platform U is a part of the second reference plane formed by blocking a part of the second flow channel and correspondingly connecting the first flow channels on the back. Alternatively, a plurality of lower support platforms D may also be provided at a position of the second polar plate corresponding to the synchronous undulation area. The lower support platform D is a part of the fourth reference plane formed by blocking a part of the fourth flow channel correspondingly connecting the third flow channels on the back. In the assembled bipolar plate, the upper support platform U is in contact with a part of the fourth reference plane in the synchronous undulation area, and the lower support platform D is in contact with a part of the second reference plane in the synchronous undulation area.

Further, after Step 2, Method 1 further includes Step 3: Fixedly connect the first polar plate 1 with the second polar plate 2 by welding or bonding, etc.

The present disclosure further provides a method for assembling a bipolar plate by integral misalignment, which is referred to as Method 2 below. It includes the following steps:

Step 1: Fabricate the first polar plate 1 and the second polar plate 2 of the bipolar plate in Embodiments 1 to 4. In a preferred method, a metal or alloy sheet with a thickness of about 0.1 mm is cut into a predetermined shape and then placed in a mold for stamping. A concave-convex structure in the mold corresponds to a concave-convex structure of the first polar plate and the second polar plate. The first polar plate 1 and the second polar plate 2 are corrugated. The back of the bottom of the first flow channel 111 is a part of the second reference plane 122, the back of the bottom of the second flow channel 121 is a part of the first reference plane 112, the back of the bottom of the third flow channel 211 is a part of the fourth reference plane 222, and the back of the bottom of the fourth flow channel 221 is a part of the third reference plane 212. A top width of each of the first flow channel 111, the second flow channel 121, the third flow channel 211 and the fourth flow channel 221 is larger than a bottom width thereof. Cross-sections of the first flow channel 111, the second flow channel 121, the third flow channel 211 and the fourth flow channel 221 are identical and are isosceles trapezoids. The first reference plane 112 and the second reference plane 122 are planes parallel to each other, and the third reference plane 212 and the fourth reference plane 222 are planes parallel to each other.

The first polar plate 1 is provided with a center of a first side flow field, and the first flow channels 111 on the first side 11 are symmetrically arranged with the center of the first side flow field as a symmetry point. In this way, the reverse flow and forward flow of a fluid in the first side flow field formed by the first flow channels 111 have the same effect. The second polar plate 2 is provided with a center of a third side flow field, and the third flow channels 211 on the third side 21 are symmetrically arranged with the center of the third side flow field as a symmetry point. In this way, the reverse flow and forward flow of the fluid in the third side flow field formed by the third flow channels 211 have the same effect.

Step 2: Combine the first polar plate 1 and the second polar plate 2 into the bipolar plate.

As shown in FIGS. 6B, 7, 8B and 9, the second side 12 of the first polar plate 1 is attached to the fourth side 22 of the second polar plate 2, such that a part of the second reference plane is in contact with a part of the fourth reference plane, and the center of the first side flow field is misaligned with the center of the third side flow field. A distance between a projection of the center of the first side flow field in a fifth reference plane and a projection of the center of the third side flow field in the fifth reference plane is δ, $w/2<δ<2w$, where, w represents a width of the first flow channel 111 at a depth that is half of a total depth of the first flow channel. The fifth reference plane is a virtual projection plane perpendicular to a thickness direction of the bipolar plate. The thickness direction of the bipolar plate is consistent with the thickness direction of the first polar plate on the bipolar plate. A misalignment direction is defined as being parallel to a line connecting the projection of the center of the first side flow field in the fifth reference plane and the projection of the center of the third side flow field in the fifth reference plane. The center of the first side flow field is a fixed point on the first polar plate, and the center of the third side flow field is a fixed point on the second polar plate. Therefore, it is not necessary to determine the specific positions of the center of the first side flow field and the center of the third side flow field during misalignment assembly. It only needs to perform the misalignment assembly of the two polar plates by means of positioning devices on the first polar plate and the second polar plate. The positioning devices are designed as two slits with a distance of δ or two circular holes with a distance of δ between two circle centers and partially overlapping. With the help of the positioning devices, the center of the first side flow field and the center of the third side flow field on the two polar plates can be misaligned by a distance of δ without measuring the specific positions of the center of the first side flow field and the center of the third side flow field.

Further, in Step 2 of Method 2, due to the misalignment of the center of the first side flow field and the center of the third side flow field, there is a synchronous undulation area on the bipolar plate. The synchronous undulation area is a region on the bipolar plate, and a smallest dimension of the synchronous undulation area in the misalignment direction is larger than 2.5 times of w. The synchronous undulation area includes a part of each of the first flow channel 111, the first reference plane 112, the second flow channel 121, the second reference plane 122, the third flow channel 211, the third reference plane 212, the fourth flow channel 221 and the fourth reference plane 222. This part of the second reference plane 122 is not in contact with this part of the fourth reference plane 222. An angle between the first flow channel 111 in the synchronous undulation area and the misalignment direction ranges from 60° to 120°, and an angle between the third flow channel 211 in the synchronous undulation area and the misalignment direction ranges from 60° to 120°. As the simplest and most feasible solution, the misalignment direction is kept perpendicular to the first flow channel and the third flow channel in the synchronous undulation area. At this time, an optimal misalignment amount of the two polar plates is: $δ^*=w/2+w'/2+τ$, where w represents a width of the first flow channel at a depth that is half of a total depth of the first flow channel; w' represents a width of the second flow channel at a depth that is half of a total depth of the second flow channel; τ represents a thickness of a body of the first polar plate. Normally, w' and w are basically equal, and τ is smaller than w, so $δ^*<2w$. In fact, if $δ>2w$, a sealing groove in the first polar plate and a sealing groove in the second polar plate may be completely misaligned, which is unfavorable for the sealing of the stack.

In addition, as shown in FIGS. 3, 3A, 3B and 4, in order to prevent the flow of a coolant in the synchronous undulation area from being blocked by deformation due to the compression of upper and lower bipolar plates, a plurality of upper support platforms U are provided at a position of the first polar plate corresponding to the synchronous undulation area. The upper support platform U is a part of the second reference plane formed by blocking a part of the second flow channel and correspondingly connecting the first flow channels on the back. Alternatively, a plurality of lower support platforms D may also be provided at a position of the second polar plate corresponding to the synchronous undulation area. The lower support platform D is a part of the fourth reference plane formed by blocking a part of the fourth flow channel correspondingly connecting the third flow channels on the back. In the assembled bipolar plate, the upper support platform U is in contact with a part of the fourth reference plane in the synchronous undulation area, and the lower support platform D is in contact with a part of the second reference plane in the synchronous undulation area.

Further, after Step 2, Method 2 further includes Step 3: Fixedly connect the first polar plate 1 with the second polar plate 2 by welding or bonding, etc.

The purpose of assembling the first polar plate and the second polar plate in a misaligned manner is to form a synchronous undulation area. On the premise that the synchronous undulation area can be formed, the misalignment amount δ must be minimized to prevent the sealing groove in the first polar plate and the sealing groove in the second polar plate from being completely misaligned to affect the stack sealing. Therefore, the center of mass of the first polar plate and the center of mass of the second polar plate must be possibly close during the misalignment assembly of the first polar plate and the second polar plate. An optimal solution is that the centers of mass of the first polar plate and the second polar plate are aligned and overlapped. Therefore, Method 2 preferentially considers the following two cases.

1. On the first polar plate 1 fabricated in Step 1, the projections of the center of the first side flow field and the center of mass of the first polar plate in the fifth reference plane overlap. On the second polar plate 2 fabricated in Step 1, the projections of the center of the third side flow field and the center of mass of the second polar plate in the fifth reference plane do not overlap, and have a distance that is equal to δ. In Step 2, the projection of the center of mass of the first polar plate 1 in the fifth reference plane overlaps with the projection of the center of mass of the second polar plate 2 in the fifth reference plane.

2. On the first polar plate 1 fabricated in Step 1, the projections of the center of the first side flow field and the center of mass of the first polar plate in the fifth reference plane do not overlap, and have a distance that is equal to half of δ. On the second polar plate 2 fabricated in Step 1, the projections of the center of the third side flow field and the center of mass of the second polar plate in the fifth reference plane do not overlap, and have a distance that is equal to half of δ. In Step 2, the projection of the center of mass of the first polar plate 1 in the fifth reference plane overlaps with the projection of the center of mass of the second polar plate 2 in the fifth reference plane.

Figure 3:
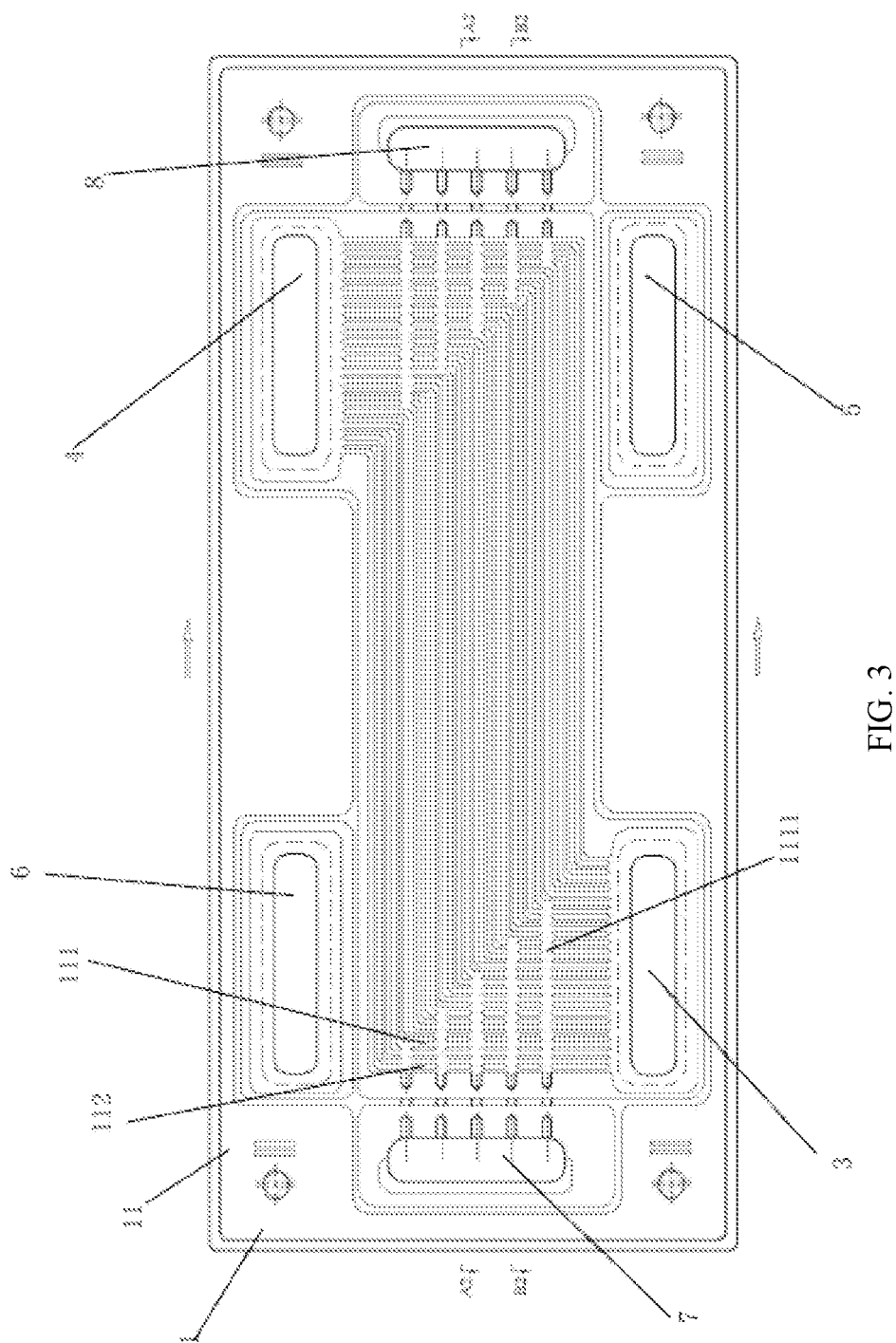
FIG. 3 is a structural schematic diagram of a bipolar plate in Embodiment 3 of a method for assembling a bipolar plate by integral misalignment according to the present disclosure.
Figure 3A:
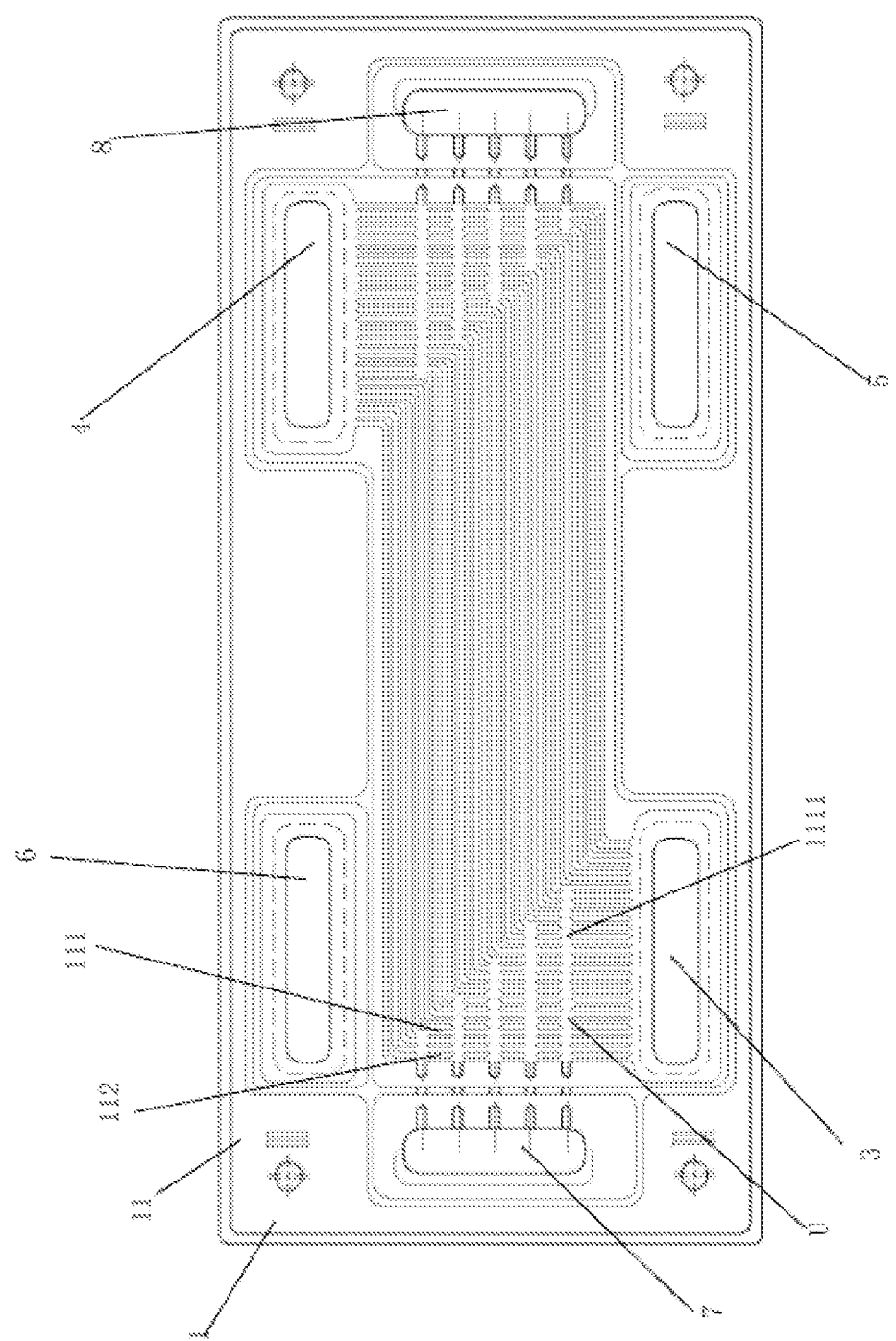
FIG. 3A is a structural schematic diagram of a first polar plate in Embodiment 3 of the method for assembling a bipolar plate by integral misalignment according to the present disclosure.
Figure 3B:
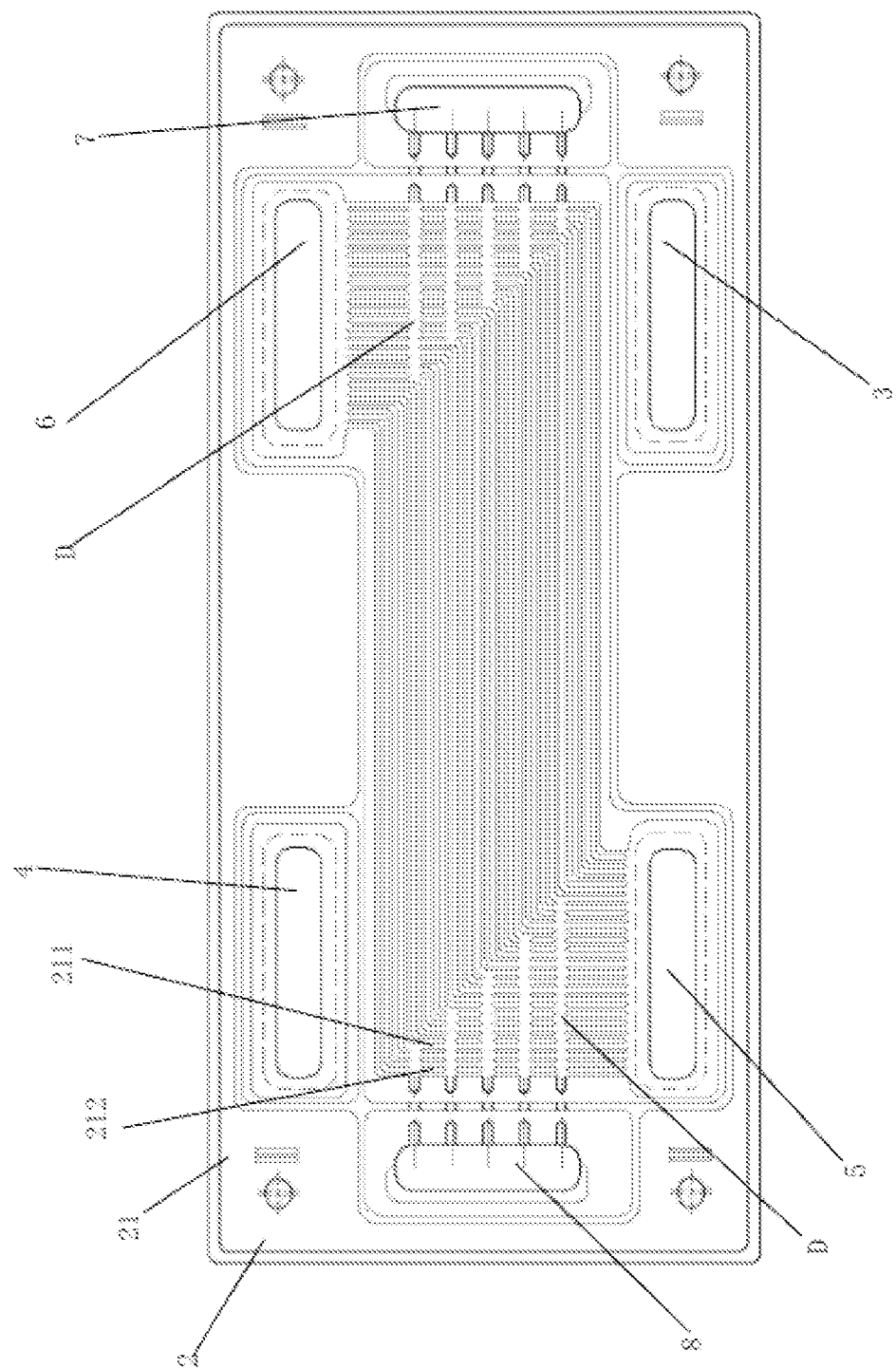
FIG. 3B is a structural schematic diagram of a second polar plate in Embodiment 3 of the method for assembling a bipolar plate by integral misalignment according to the present disclosure.

In Method 1 and Method 2 of the present disclosure, the first polar plate 1 and the second polar plate 2 fabricated in Step 1 preferably have the same geometric shape. The first side 11 of the first polar plate 1 is the same as the third side 21 of the second polar plate 2, and the second side 12 of the first polar plate 1 is the same as the fourth side 22 of the second polar plate 2. The first polar plate 1 and the second polar plate 2 are separately provided with a fuel inlet channel 3, a fuel outlet channel 4, an oxidant inlet channel 5 and an oxidant outlet channel 6. When the first polar plate and the second polar plate have the same shape, the assembly of the bipolar plate is actually to fit the second sides 12 of the two first polar plates together. Therefore, the cross-sectional area of the oxidant inlet channel must be inevitably the same as the cross-sectional area of the fuel inlet channel or the same as the cross-sectional area of the fuel outlet channel. However, this will cause a problem. In a fuel cell stack, it is usually required that the cross-sectional area of the oxidant inlet channel is larger than the cross-sectional area of the fuel inlet channel and the cross-sectional area of the fuel outlet channel. Sometimes the same requirement is imposed on the oxidant outlet channel. To solve this problem, after the step of fixedly connecting the first polar plate 1 with the second polar plate 2, the method further includes the following step: cut an edge of the oxidant inlet channel 5 and an edge of the oxidant outlet channel 6, or fill a cover plate in the fuel inlet channel 3 and the fuel outlet channel 4, such that a cross-sectional area of the oxidant inlet channel 5 is larger than a cross-sectional area of the fuel inlet channel 3 and a cross-sectional area of the fuel outlet channel 4, and a cross-sectional area of the oxidant outlet channel 6 is larger than the cross-sectional area of the fuel inlet channel 3 and the cross-sectional area of the fuel outlet channel 4. In FIGS. 1 and 3, the dashed lines in the oxidant inlet channel 5 and the oxidant outlet channel 6 indicate cutting lines. In FIG. 1, inner edges of the oxidant inlet channel 5 and the oxidant outlet channel 6 are partially cut. In FIG. 3, the inner edges of the oxidant inlet channel 5 and the oxidant outlet channel 6 are all cut. The cover plate placed in the fuel inlet channel 3 may be an annular plastic plate. An outer shape of the cover plate is similar to the inner edge of the fuel inlet channel 3, and an area of an inner hole of the cover plate is smaller than the cross-sectional area of the oxidant inlet channel 5. The cover plate is placed in a recess formed by a welding band along the inner edge of the fuel inlet channel 3. An outer shape of the cover plate placed in the fuel outlet channel 4 is similar to the inner edge of the fuel outlet channel 4, and an area of an inner hole of the cover plate is smaller than the cross-sectional area of the fuel outlet channel 4. The cover plate is placed in a recess formed by a welding band along the inner edge of the fuel outlet channel 4.

In Method 1 and Method 2 of the present disclosure, the first polar plate 1 and the second polar plate 2 fabricated in Step 1 are provided with positioning devices for misalignment assembly, respectively. The positioning devices are symmetrical with a centerline of the bipolar plate as a symmetry axis, wherein the centerline of the bipolar plate is parallel to the misalignment direction. In Method 1, the misalignment direction is parallel to a line connecting the projections of the centers of mass of the two polar plates in the fifth reference plane. In Method 2, the misalignment direction is parallel to a line connecting the projections of the center of the first side flow field and the center of the third side flow field in the fifth reference plane. In Step 2, the positioning devices are used to determine relative positions of the first polar plate 1 and the second polar plate 2. When the two polar plates have the same shape, to assemble the two polar plates together, one of the polar plates needs to be turned over to fit with the other polar plate. To this end, the positioning devices are designed to be symmetrical with the centerline of the bipolar plate parallel to the misalignment direction as a symmetry axis, ensuring that the positioning device on the polar plate does not change after the polar plate is turned over.

Figure 2A:
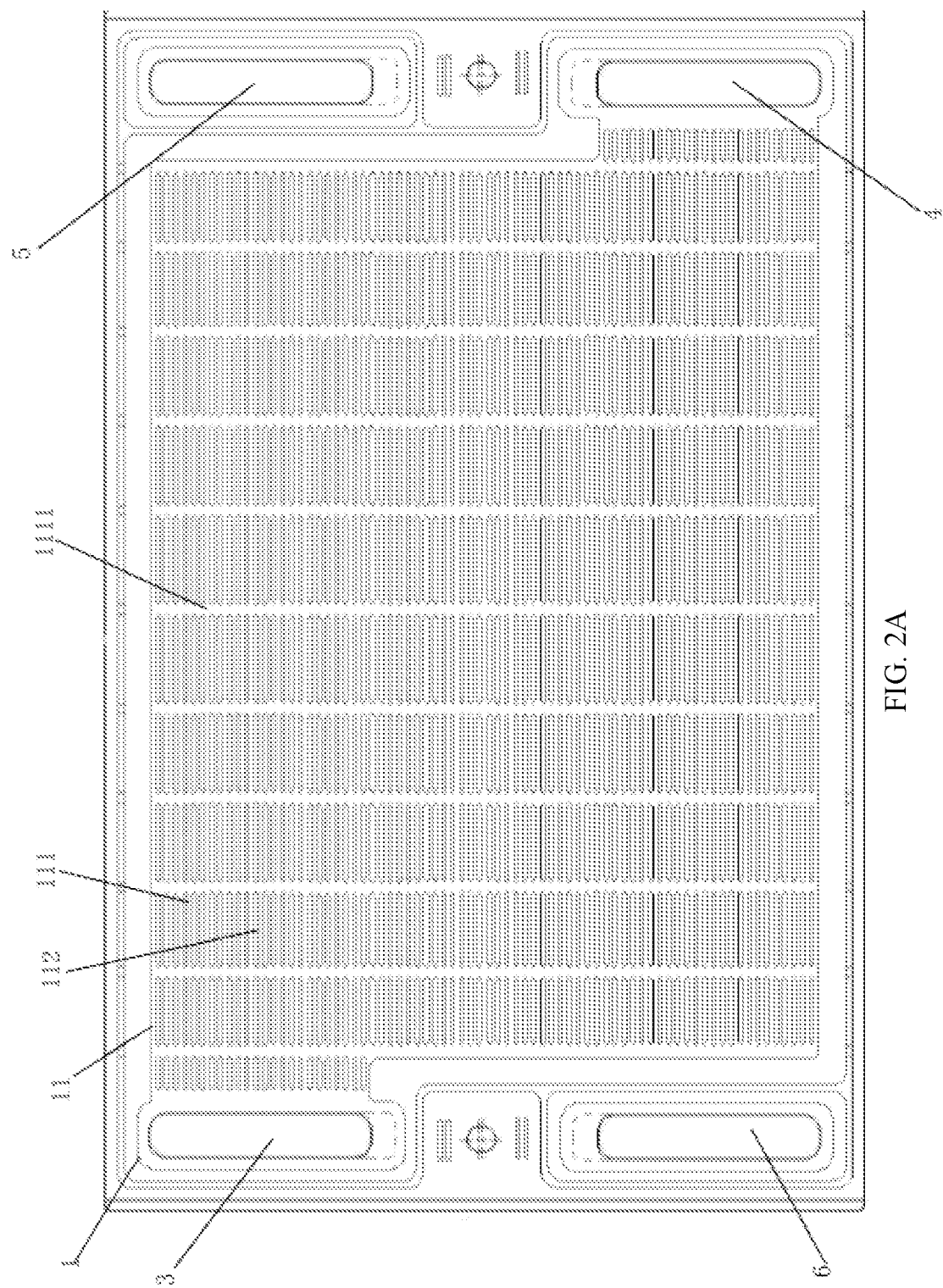
FIG. 2A is a structural schematic diagram of a first polar plate in Embodiment 2 of the method for assembling a bipolar plate by integral misalignment according to the present disclosure.
Figure 2B:
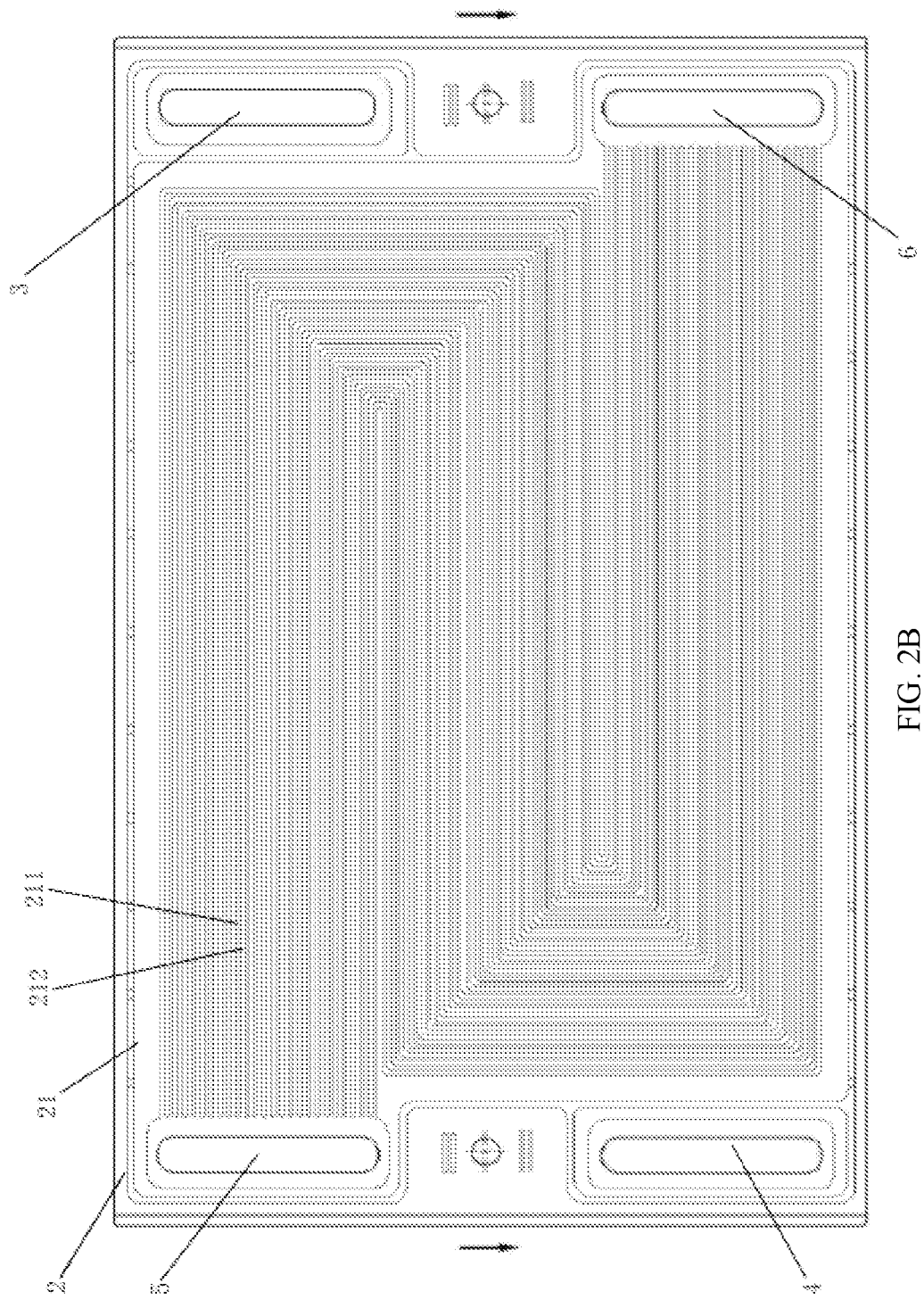
FIG. 2B is a structural schematic diagram of a second polar plate in Embodiment 2 of the method for assembling a bipolar plate by integral misalignment according to the present disclosure.

In Method 1 and Method 2 of the present disclosure, when no coolant inlet channel and coolant outlet channel are provided, as shown in FIGS. 1 to 2B, there are the following two cases:

1. The first polar plate 1 and the second polar plate 2 fabricated in Step 1 are not provided with a coolant inlet channel and a coolant outlet channel. On the first polar plate 1 there are a plurality of parallel straight-through first flow channels 111 and a transverse flow channel 1111 formed by cutting ribs between the first flow channels 111. The back of the transverse flow channel 1111 formed by cutting the ribs between the first flow channels 111 is the second reference plane 122 that is formed by blocking the second flow channel 121 and plays a role in supporting, that is, the upper support platform U. The second polar plate 2 has the same shape as the first polar plate 1.

2. The first polar plate 1 and the second polar plate 2 fabricated in Step 1 are not provided with a coolant inlet channel and a coolant outlet channel. On the first polar plate 1 there are a plurality of parallel straight-through first flow channels 111 and a transverse flow channel 1111 formed by cutting ribs between the first flow channels 111. The back of the transverse flow channel 1111 formed by cutting the ribs between the first flow channels 111 is the second reference plane 122 that is formed by blocking the second flow channel 121 and plays a role in supporting, that is, the upper support platform U. The second polar plate 2 is a serpentine flow field plate.

Figure 4:
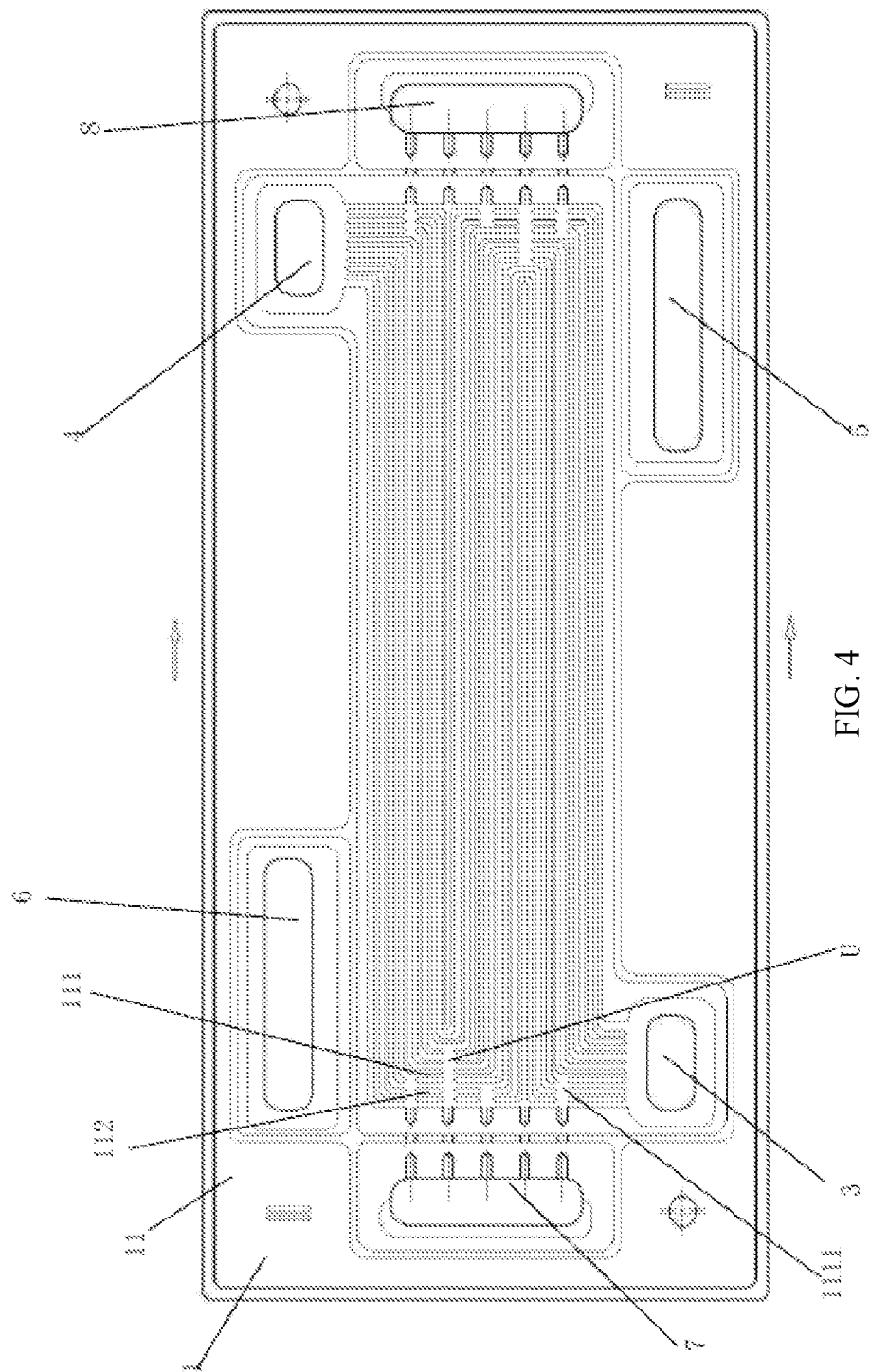
FIG. 4 is a structural schematic diagram of a first polar plate in Embodiment 4 of the method for assembling a bipolar plate by integral misalignment according to the present disclosure.
Figure 5:
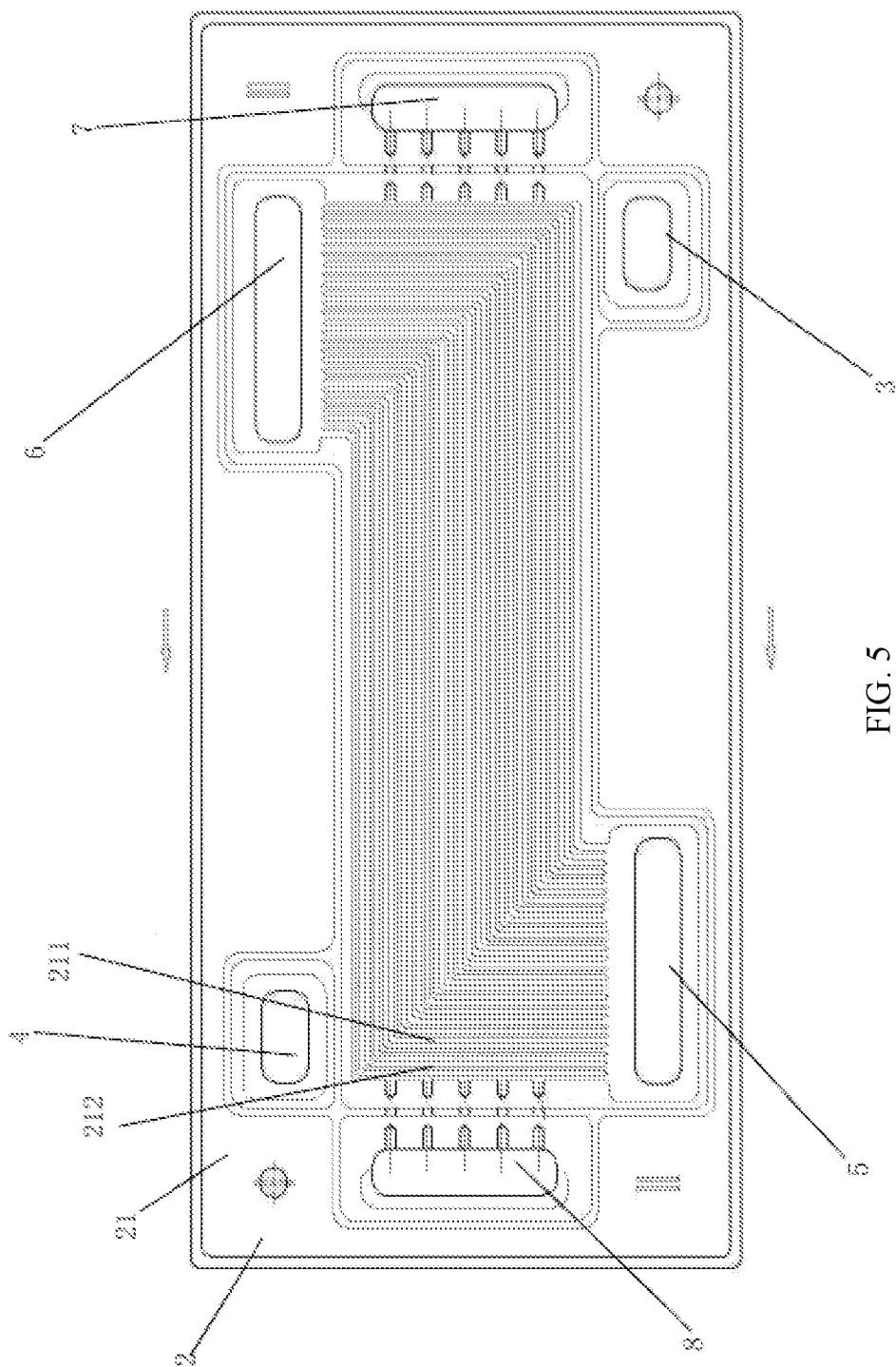
FIG. 5 is a structural schematic diagram of a second polar plate in Embodiment 4 of the method for assembling a bipolar plate by integral misalignment according to the present disclosure.
Figure 6A:
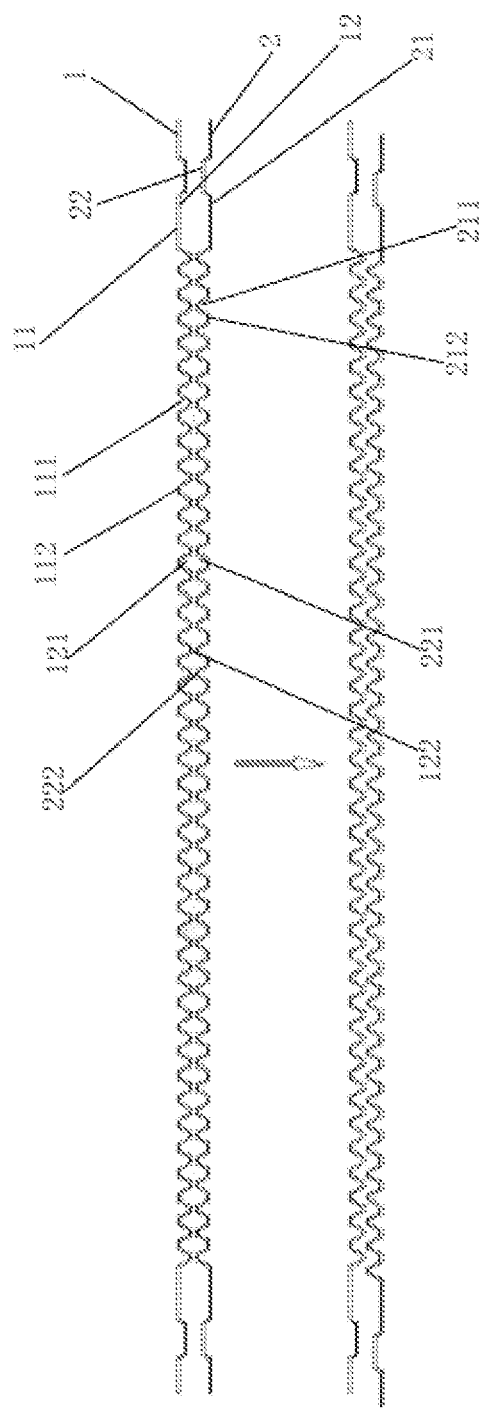
FIG. 6A is a cross-sectional view of FIG. 1 along the A1-A1 direction, showing that the center of mass of the first polar plate and the center of mass of the second polar plate are misaligned.
Figure 6B:
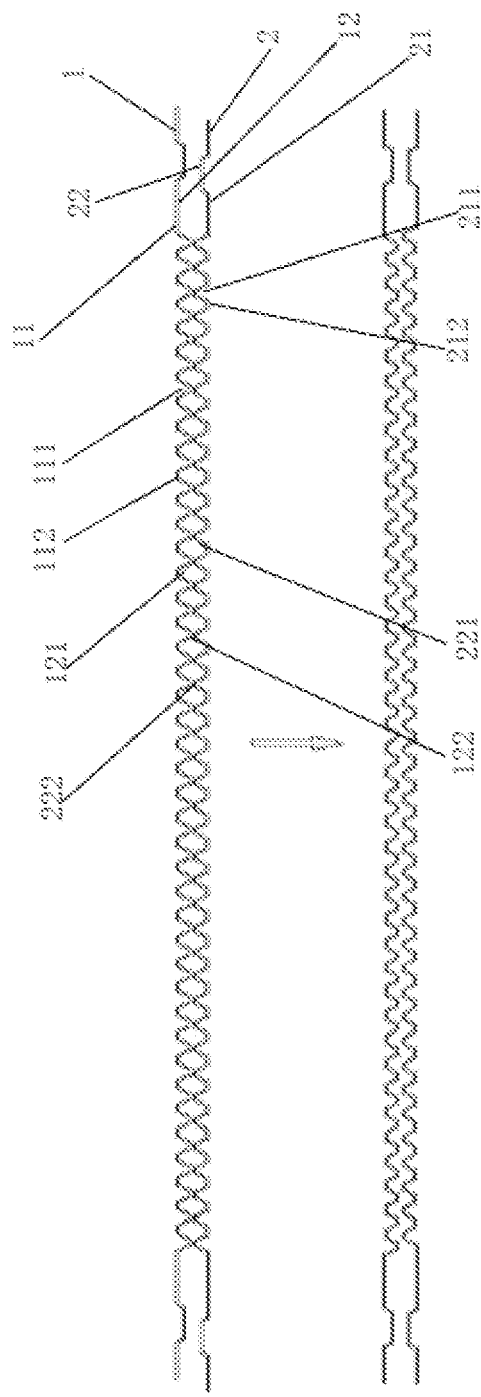
FIG. 6B is a cross-sectional view of FIG. 1 along the A1-A1 direction, showing that the center of flow field of the first polar plate and the center of flow field of the second polar plate are misaligned.
Figure 7:
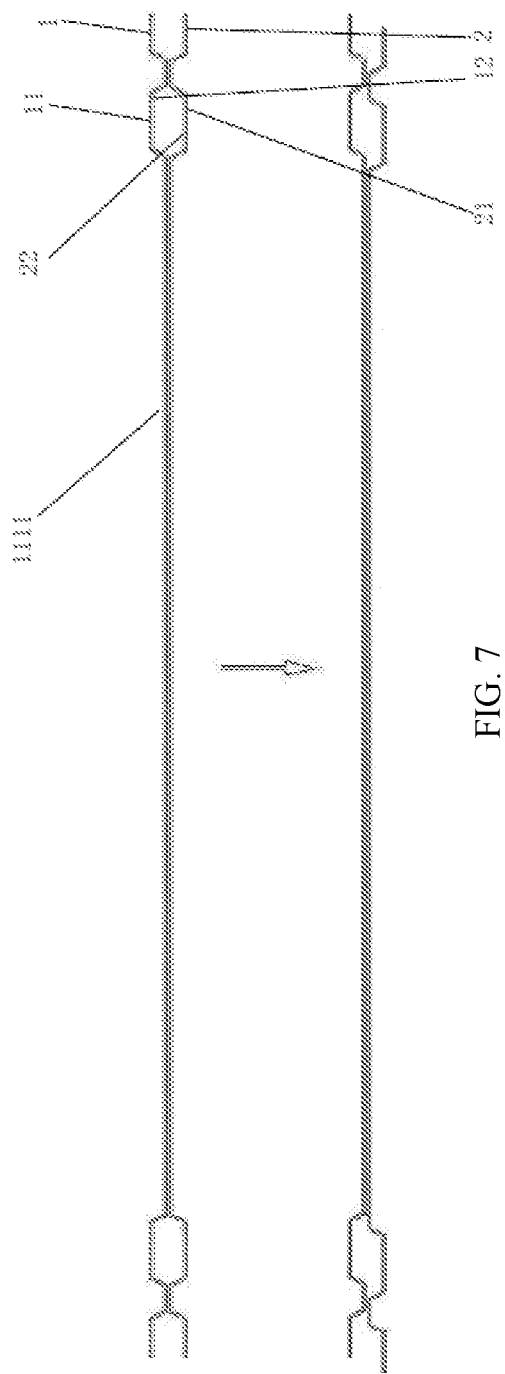
FIG. 7 is a cross-sectional view of FIG. 1 along the B1-B1 direction.
Figure 8A:
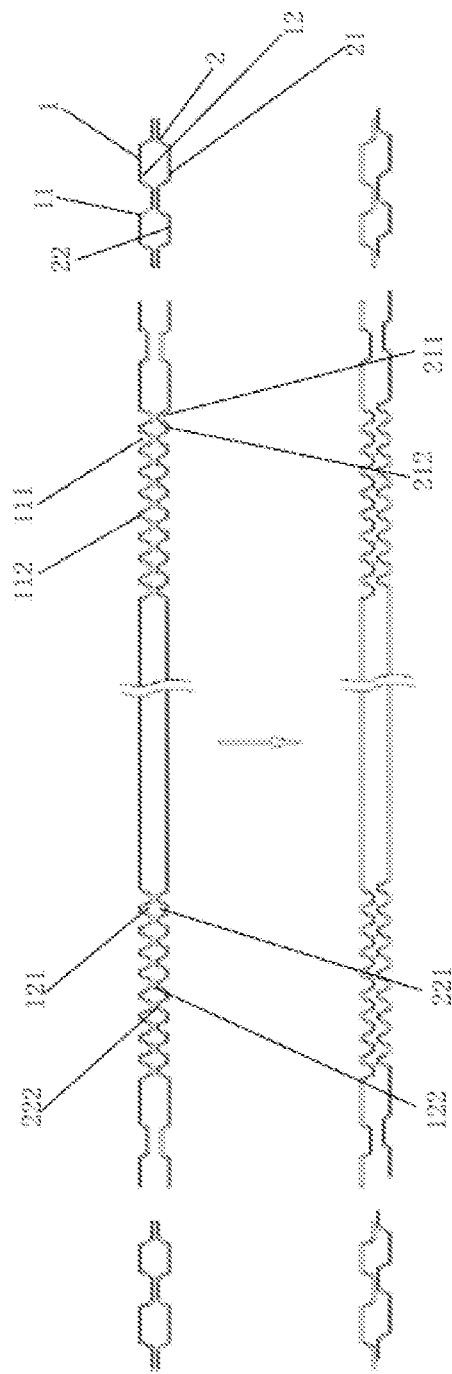
FIG. 8A is a cross-sectional view of FIG. 3 along the A2-A2 direction, showing that the center of mass of the first polar plate and the center of mass of the second polar plate are misaligned.
Figure 8B:
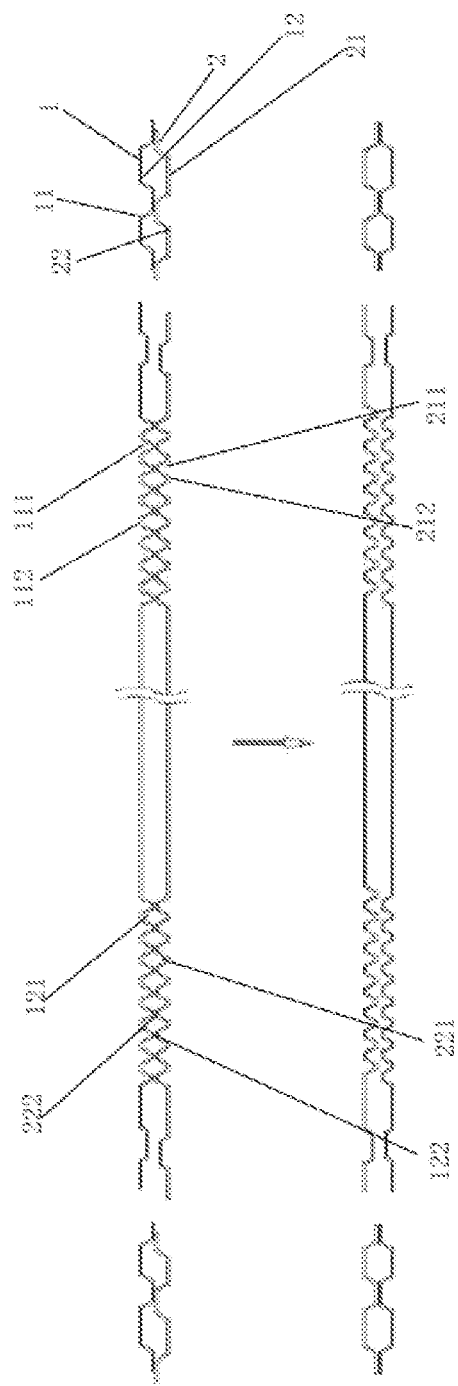
FIG. 8B is a cross-sectional view of FIG. 3 along the A2-A2 direction, showing that the center of flow field of the first polar plate and the center of flow field of the second polar plate are misaligned.
Figure 9:
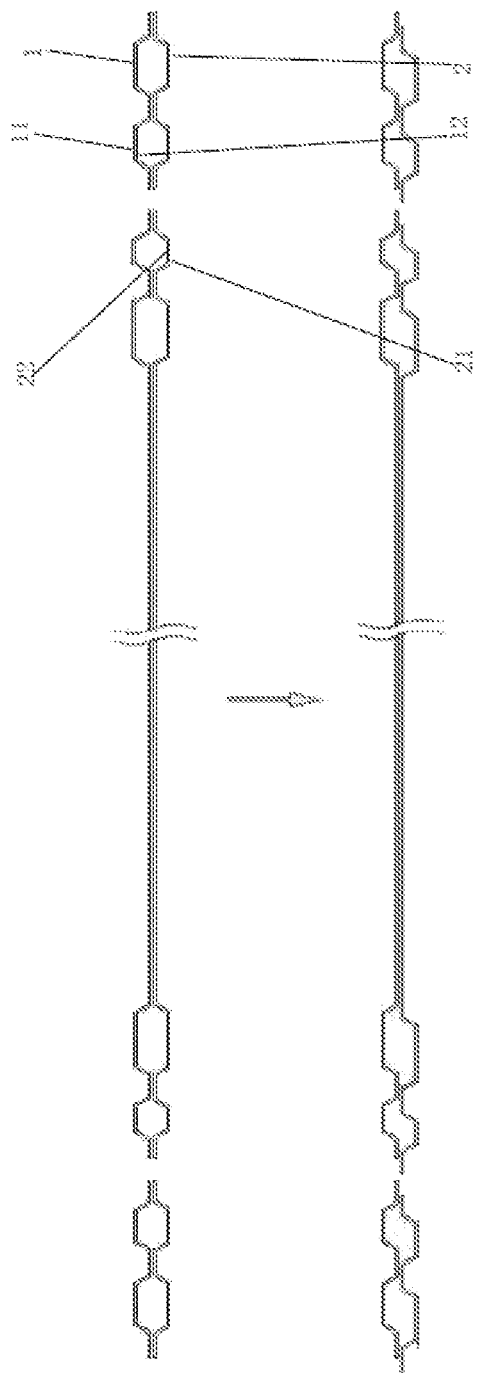
FIG. 9 is a cross-sectional view of FIG. 3 along the B2-B2 direction.

In Method 1 of the present disclosure, when a coolant inlet channel and a coolant outlet channel are provided, as shown in FIGS. 3 to 5, there are the following two cases:

1. The first polar plate 1 and the second polar plate 2 fabricated in Step 1 are respectively provided with a coolant inlet channel 7 and a coolant outlet channel 8. The coolant inlet channel 7 and the coolant outlet channel 8 on the first polar plate 1 are symmetrical with the center of mass of the first polar plate as a symmetry point. The coolant inlet channel 7 and the coolant outlet channel 8 on the second polar plate 2 are symmetrical with the center of mass of the second polar plate as a symmetry point. The first polar plate 1 is a Z-shaped flow field plate, and the first flow channel 111 and the second flow channel 121 are Z-shaped flow channels. The second polar plate 2 and the first polar plate 1 have the same geometric shape.

2. The first polar plate 1 and the second polar plate 2 fabricated in Step 1 are respectively provided with a coolant inlet channel 7 and a coolant outlet channel 8. The coolant inlet channel 7 and the coolant outlet channel 8 on the first polar plate 1 are symmetrical with the center of mass of the first polar plate as a symmetry point. The coolant inlet channel 7 and the coolant outlet channel 8 on the second polar plate 2 are symmetrical with the center of mass of the second polar plate as a symmetry point. The first polar plate 1 is a Z-shaped flow field plate, and the first flow channel 111 and the second flow channel 121 are Z-shaped flow channels. The second polar plate 2 is a serpentine flow field plate. The third flow channel 211 and the fourth flow channel 221 are serpentine flow channels, and an end of the serpentine flow channel is bent at 90° and is located on a side of the second polar plate 2.

In Method 2 of the present disclosure, when a coolant inlet channel and a coolant outlet channel are provided, as shown in FIGS. 3 to 5, there are the following two cases:

1. The first polar plate 1 and the second polar plate 2 fabricated in Step 1 are respectively provided with a coolant inlet channel 7 and a coolant outlet channel 8. The coolant inlet channel 7 and the coolant outlet channel 8 on the first polar plate 1 are symmetrical with the center of the first side flow field as a symmetry point. The coolant inlet channel 7 and the coolant outlet channel 8 on the second polar plate 2 are symmetrical with the center of the third side flow field as a symmetry point. The first polar plate 1 is a Z-shaped flow field plate, and the first flow channel 111 and the second flow channel 121 are Z-shaped flow channels. The second polar plate 2 and the first polar plate 1 have the same geometric shape.

2. The first polar plate 1 and the second polar plate 2 fabricated in Step 1 are respectively provided with a coolant inlet channel 7 and a coolant outlet channel 8. The coolant inlet channel 7 and the coolant outlet channel 8 on the first polar plate 1 are symmetrical with the center of the first side flow field as a symmetry point. The coolant inlet channel 7 and the coolant outlet channel 8 on the second polar plate 2 are symmetrical with the center of the third side flow field as a symmetry point. The first polar plate 1 is a Z-shaped flow field plate, and the first flow channel 111 and the second flow channel 121 are Z-shaped flow channels. The second polar plate 2 is a serpentine flow field plate. The third flow channel 211 and the fourth flow channel 221 are serpentine flow channels, and an end of the serpentine flow channel is bent at 90° and is located on a side of the second polar plate 2.

As shown in FIGS. 10 to 15, the present disclosure further provides a fuel cell stack with the bipolar plate fabricated by Method 1 or Method 2.

In an embodiment of the fuel cell stack, the fuel cell stack includes at least three bipolar plates fabricated by Method 1.

In the fuel cell stack, the first flow channel 111 of the first polar plate 1 of each bipolar plate is a fuel flow channel, and the third flow channel 211 of the second polar plate 2 of each bipolar plate is an oxidant flow channel. For a first polar plate 1 and a second polar plate 2 that clamp the same MEA 9 and belong to two different bipolar plates, the projection of the center of mass of the first polar plate 1 in the sixth reference plane and the projection of the center of mass of the second polar plate 2 in the sixth reference plane overlap or have a distance smaller than d. For two spaced-apart bipolar plates, the projections of the centers of mass of the two first polar plates 1 in the sixth reference plane overlap or have a distance smaller than d, and the projections of the centers of mass of the two second polar plates 2 in the sixth reference plane overlap or have a distance smaller than d. Two MEAS 9 and one bipolar plate are sandwiched between the two spaced-apart bipolar plates. The sixth reference plane is a virtual projection plane perpendicular to the thickness directions of the at least three bipolar plates.

Figure 10:
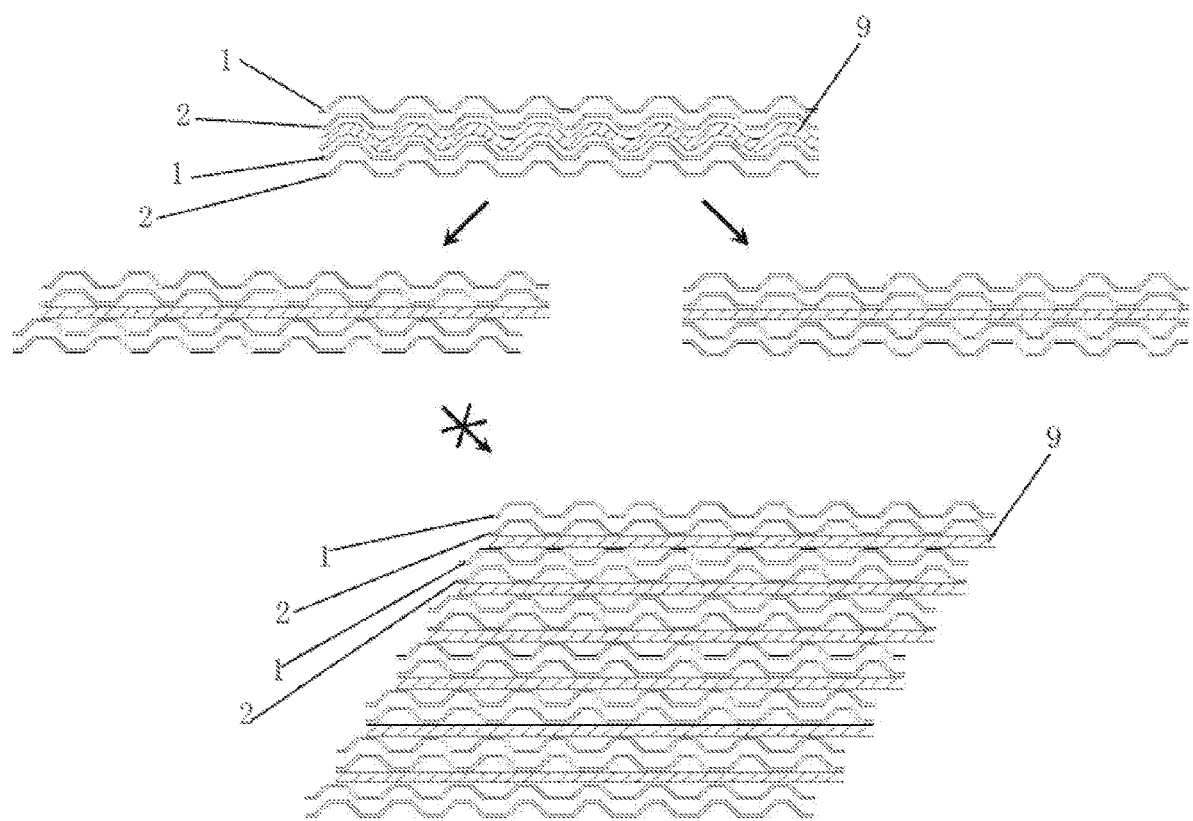
FIG. 10 is a schematic view showing that a MEA of a fuel cell stack wrinkles in a corresponding part shown in FIGS. 6A and 6B.
Figure 11:
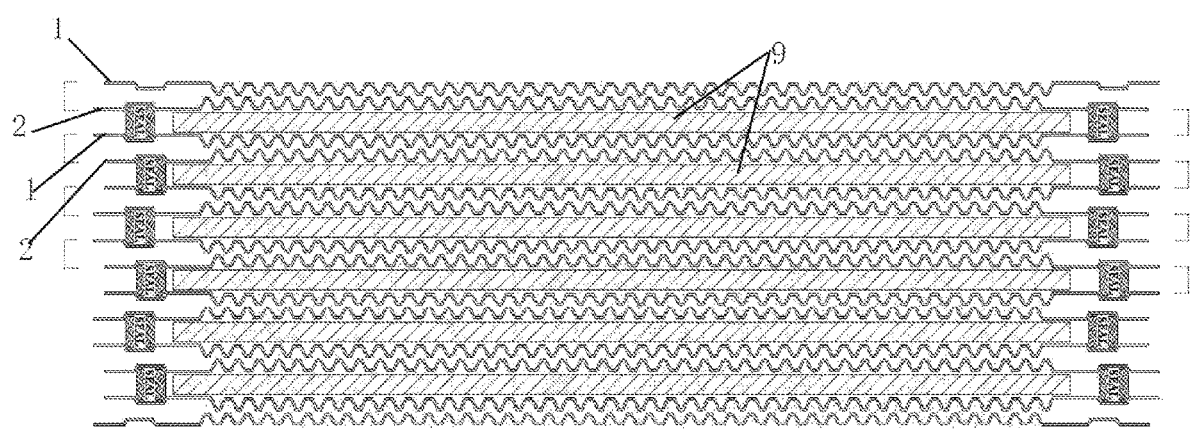
FIG. 11 is an assembly view of the fuel cell stack corresponding to FIG. 6A, where the center of mass of the first polar plate and the center of the flow field of the first polar plate overlap, the center of mass of the second polar plate and the center of the flow field of the second polar plate overlap, the edges of the first polar plate and the edges of the second polar plate are misaligned, the inlet/outlet channels of the first polar plate and the inlet/outlet channels of the second polar plate are misaligned.
Figure 12:
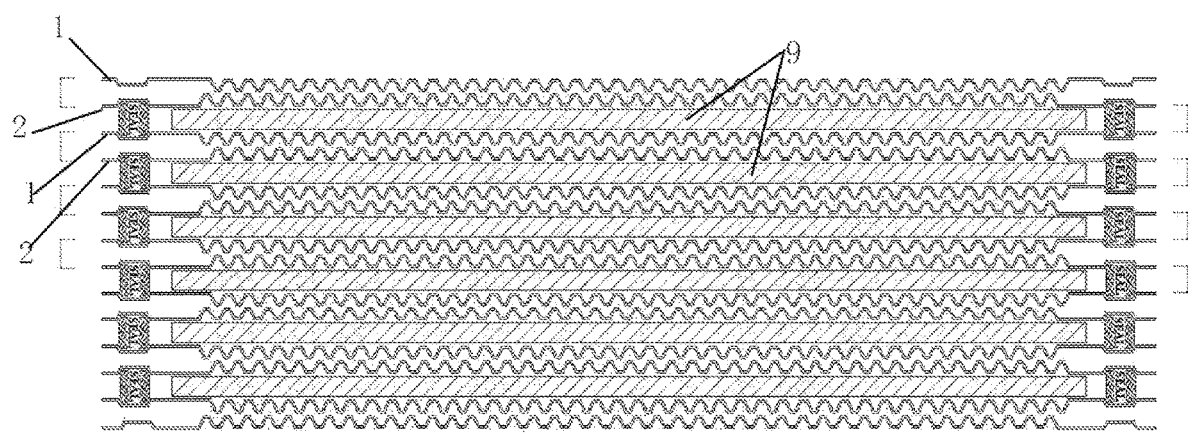
FIG. 12 is an assembly view of the fuel cell stack corresponding to FIG. 6B, where the center of mass of the first polar plate and the center of the flow field of the first polar plate deviate (that is, the projection of the center of mass of the first polar plate and the projection of the center of the flow field of the first polar plate in a fifth reference plane do not overlap), the center of mass of the second polar plate and the center of the flow field of the second polar plate deviate (that is, the projection of the center of mass of the second polar plate and the projection of the center of the flow field of the second polar plate in a fifth reference plane do not overlap), the edges of the first polar plate and the edges of the second polar plate are aligned, the inlet/outlet channels of the first polar plate and the inlet/outlet channels of the second polar plate are aligned.
Figure 13:
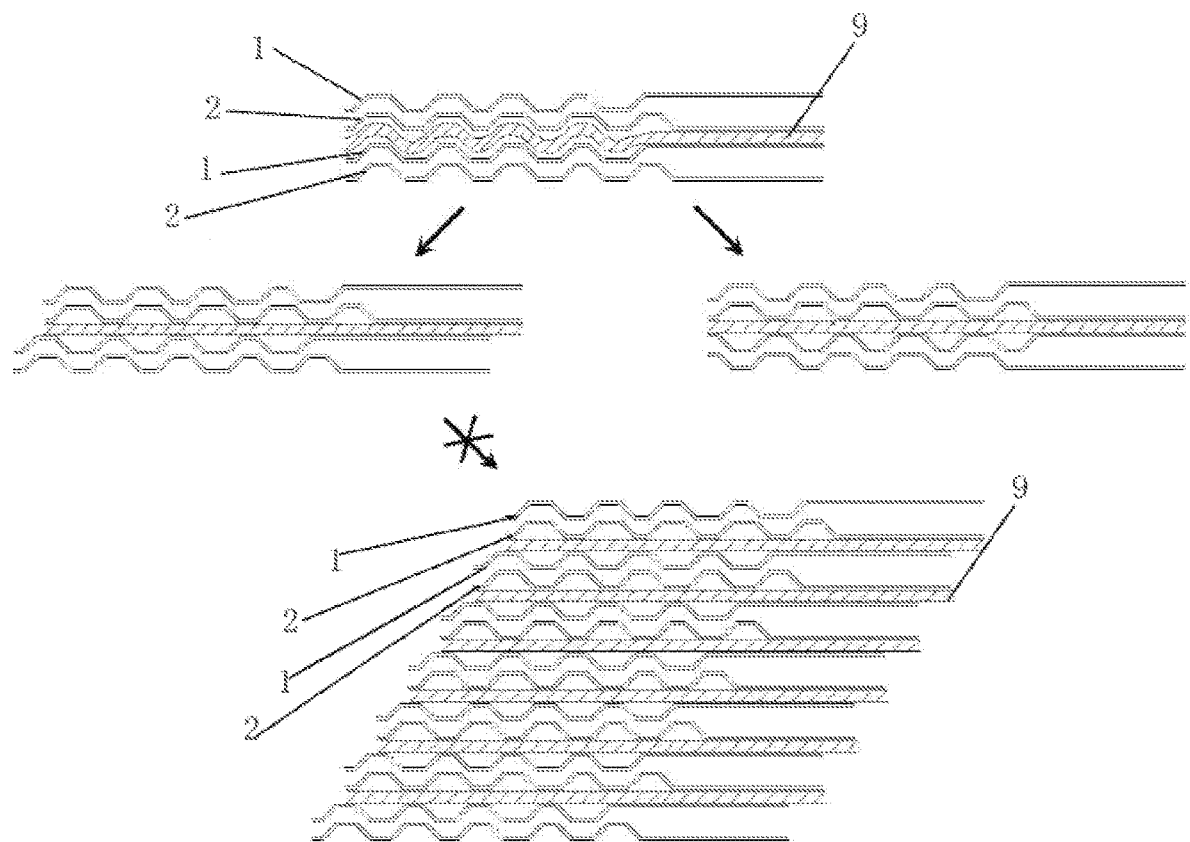
FIG. 13 is a schematic view showing that a MEA of a fuel cell stack wrinkles in a corresponding part shown in FIGS. 8A and 8B.
Figure 14:
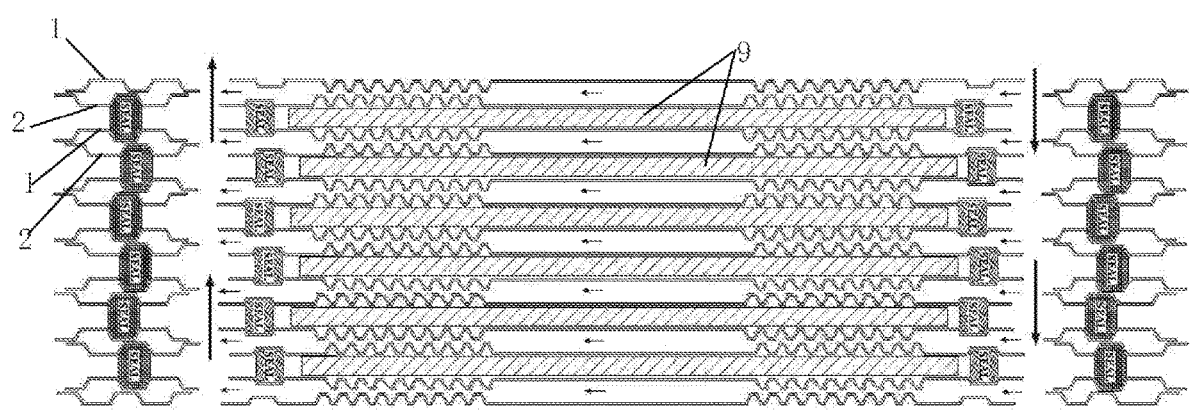
FIG. 14 is an assembly view of the fuel cell stack corresponding to FIG. 8A, where the center of mass of the first polar plate and the center of the flow field of the first polar plate overlap, the center of mass of the second polar plate and the center of the flow field of the second polar plate overlap, the edges of the first polar plate and the edges of the second polar plate are misaligned, the inlet/outlet channels of the first polar plate and the inlet/outlet channels of the second polar plate are misaligned.
Figure 15:
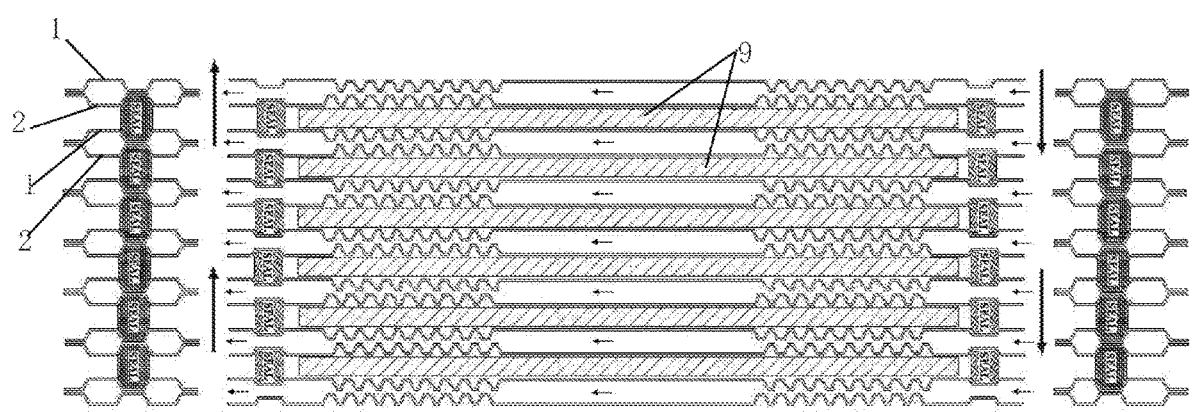
FIG. 15 is an assembly view of the fuel cell stack corresponding to FIG. 8B, where the center of mass of the first polar plate and the center of the flow field of the first polar plate deviate (that is, the projection of the center of mass of the first polar plate and the projection of the center of the flow field of the first polar plate in a fifth reference plane do not overlap), the center of mass of the second polar plate and the center of the flow field of the second polar plate deviate (that is, the projection of the center of mass of the second polar plate and the projection of the center of the flow field of the second polar plate in a fifth reference plane do not overlap), the edges of the first polar plate and the edges of the second polar plate are aligned, the inlet/outlet channels of the first polar plate and the inlet/outlet channels of the second polar plate are aligned.

Through the bipolar plate fabricated by Method 1, the present disclosure can prevent the MEA in the fuel cell stack from wrinkling. The results of previous studies have shown that the MEA may wrinkle when bipolar plates with a misalignment area or a synchronous undulation area are assembled into a fuel cell stack. The top figure in FIG. 10 shows that the MEA wrinkles when the bipolar plates described in Embodiment 1 and Embodiment 2 are assembled into the fuel cell stack. The top figure in FIG. 13 shows that the MEA wrinkles when the bipolar plates described in Embodiment 3 and Embodiment 4 are assembled into the fuel cell stack. The wrinkles of the MEA will cause blockage of the reactant flow channel and poor contact of the circuit. The simplest solution to this problem is to assemble the two bipolar plates clamping the same MEA in a misaligned manner, with a misalignment amount of d, as shown in the middle left figures of FIGS. 10 and 13. However, for a high-power fuel cell stack, due to the large number of bipolar plates, if the bipolar plates are misaligned in the same direction, it will inevitably lead to the tilt of the stack, which is obviously not feasible, as shown in the bottom figures of FIGS. 10 and 13. For the bipolar plate provided by the present disclosure, if the first polar plate and the second polar plate are symmetrical, the bipolar plate can be rotated 180° around an axis parallel to the thickness direction of the bipolar plate. That is, the fuel inlet channel and the fuel outlet channel of the bipolar plate are exchanged, the oxidant inlet channel and the oxidant outlet channel are exchanged, and the coolant inlet channel and the coolant outlet channel are exchanged. In this way, the above problem can be solved. Of course, the premise for this solution is that the first polar plate and the second polar plate are symmetrical. The bipolar plate provided by the present disclosure satisfies this premise, and thus can solve the wrinkle problem of the MEA. Another solution to avoid wrinkles of the MEA is to rotate one of the two bipolar plates clamping the same MEA 180° around an axis parallel to the misalignment direction. That is, one of the two bipolar plates clamping the same MEA is turned over, such that the first polar plate and the second polar plate are exchanged, as shown in the middle right figures of FIGS. 10 and 13. Of course, the premise for this solution is that the first polar plate and the second polar plate have the same shape. The bipolar plate provided by the present disclosure satisfies this premise.

In an embodiment of the fuel cell stack, the fuel cell stack includes at least three bipolar plates fabricated by Method 2.

In the fuel cell stack, the first flow channel 111 of the first polar plate 1 of each bipolar plate is a fuel flow channel, and the third flow channel 211 of the second polar plate 2 of each bipolar plate is an oxidant flow channel. For a first polar plate 1 and a second polar plate 2 that clamp the same MEA 9 and belong to two different bipolar plates, the projection of the center of the first side flow field of the first polar plate 1 in the sixth reference plane and the projection of the center of the third side flow field of the second polar plate 2 in the sixth reference plane overlap or have a distance smaller than δ. For two spaced-apart bipolar plates, the projections of the centers of the first side flow fields of the two first polar plates 1 in the sixth reference plane overlap or have a distance smaller than δ, and the projections of the centers of the third side flow fields of the two second polar plates 2 in the sixth reference plane overlap or have a distance smaller than δ. Two MEAS 9 and one bipolar plate are sandwiched between the two spaced-apart bipolar plates. The sixth reference plane is a virtual projection plane perpendicular to the thickness directions of the at least three bipolar plates.

Through the bipolar plate fabricated by Method 2, the present disclosure can prevent the MEA in the fuel cell stack from wrinkling.

In the fuel cell stack of the present disclosure, the first polar plate 1 and the second polar plate 2 of the bipolar plate have the same geometric shape. The first polar plate 1 and the second polar plate 2 are separately provided with a fuel inlet channel 3, a fuel outlet channel 4, an oxidant inlet channel 5 and an oxidant outlet channel 6.

The fuel cell stack includes a fuel inlet channel filling rod or a fuel inlet channel filling plate. The fuel inlet channel filling rod or the fuel inlet channel filling plate is placed in the fuel inlet channel 3 to reduce the cross-sectional area of the fuel inlet channel 3.

The fuel cell stack further includes a fuel outlet channel filling rod or a fuel outlet channel filling plate. The fuel outlet channel filling rod or the fuel outlet channel filling plate is placed in the fuel outlet channel 4 to reduce the cross-sectional area of the fuel outlet channel 4.

As mentioned above, when the first polar plate and the second polar plate have the same shape, the cross-sectional area of the oxidant inlet channel must be inevitably the same as the cross-sectional area of the fuel inlet channel or the cross-sectional area of the fuel outlet channel. However, in a fuel cell stack, the cross-sectional area of the oxidant inlet channel is sometimes required to be larger than the cross-sectional area of the fuel inlet channel and the cross-sectional area of the fuel outlet channel. A simple and easy solution to this problem is to place a filling rod or a filling plate in the fuel inlet channel and the fuel outlet channel. It is less costly than the method of cutting the inner edge of the oxidant inlet channel and than the method of placing a cover plate in the fuel inlet channel.

The present disclosure further provides a fuel cell power generation system using the above fuel cell stack.

What needs to be emphasized here is that when bipolar plates with a misalignment area or a synchronous undulation area are assembled into a fuel cell stack, the problem of wrinkling of the MEA will occur. However, for the bipolar plate fabricated by the integral misalignment assembly method of the present disclosure, this problem can be solved. That is, the bipolar plate is rotated 180° around an axis parallel to the thickness direction of the bipolar plate or around a centerline parallel to the misalignment direction. In contrast, bipolar plates fabricated by changing a flow channel spacing on one of the two polar plates to form the misalignment area also faces the problem of wrinkling of the MEA when they are assembled into the stack. However, for these bipolar plates, this problem cannot be solved. This shows the advantage of the present disclosure, but the solution of the present disclosure will also bring some derivative problems.

When the fuel cell stack is assembled, in order to avoid wrinkles of the MEA, the bipolar plate is rotated 180° around an axis parallel to the thickness direction of the bipolar plate. In this solution, the fuel inlet channel and the fuel outlet channel on the bipolar plate are exchanged, the oxidant inlet channel and the oxidant outlet channel are exchanged, and the coolant inlet channel and the coolant outlet channel are exchanged. In this case, the fuel inlet channel and fuel outlet channel on the bipolar plate must have the same shape and cross-sectional area, the oxidant inlet channel and the oxidant outlet channel must have the same shape and cross-sectional area, and the coolant inlet channel and the coolant outlet channel must have the same shape and cross-sectional area. In fact, even if the cross-sectional areas of the two channels to exchange are not the same, the one with the larger cross-sectional area will be partially blocked during the stack assembly process and remain the same as the one with the smaller cross-sectional area. However, in some special cases, the two channels to exchange are required to have different cross-sectional areas. The solution to this derivative problem is as follows. If the fuel inlet channel and the fuel outlet channel in the stack are required to have different cross-sectional areas, a plate-shaped or rod-shaped filler may be provided in the fuel inlet channel or in the fuel outlet channel when the stack is assembled. Similarly, if the oxidant inlet channel and the oxidant outlet channel in the stack are required to have different cross-sectional areas, a plate-shaped or rod-shaped filler may be provided in the oxidant inlet channel or the oxidant outlet channel when the stack is assembled. If the coolant inlet channel and the coolant outlet channel in the stack are required to have different cross-sectional areas, a plate-shaped or rod-shaped filler may be provided in the coolant inlet channel or in the coolant outlet channel when the stack is assembled.

Under the premise that the first polar plate and the second polar plate have the same shape, in order to avoid wrinkles of the MEA during the assembly of the stack, the first polar plate and the second polar plate are exchanged. In this solution, various inlet/outlet channels on the bipolar plate are required to be arranged symmetrically with the centerline of the bipolar plate parallel to the misalignment direction as the symmetry axis. It is also required that the shape of the channels on the centerline are symmetrical with the centerline as the symmetry axis, and that the two channels that are symmetrical with each other with the centerline as the symmetry axis have the same shape and cross-sectional area. This is because the two channels that are symmetrical with each other with the centerline as the symmetry axis will be exchanged during the assembly process of the stack. In fact, even if the cross-sectional areas of the two mutually symmetrical channels are different, the one with the larger cross-sectional area will be partially blocked and remain the same as the one with the smaller cross-sectional area during the assembly process of the stack. However, in some special cases, the two mutually symmetrical channels are required to have different cross-sectional areas. The solution to this derivative problem is to place a plate-shaped or rod-shaped filler in one of the channels during the assembly of the stack.

Finally, it needs to be supplemented that the integral misalignment assembly method of the fuel cell bipolar plate provided in the present disclosure may also be applied to the fabrication of a flow field plate or a separator plate in other stacked devices. The bipolar plate mentioned herein may also be regarded as a flow field plate or a separator plate in other stacked devices.

The above embodiments are merely intended to exemplarily illustrate the principles and effects of the present disclosure, rather than to limit the present disclosure. Improvements may be made to various aspects of the present disclosure without departing from the general idea of the present disclosure. Those skilled in the art may modify or change the above embodiments without departing from the spirit and scope of the present disclosure. Hence, all equivalent modifications or changes made by those of ordinary skill in the art without departing from the spirit and technical teachings disclosed in the present disclosure should fall within the scope defined by appended claims to the present disclosure.

What is claimed is:

1. A method for assembling a bipolar plate by integral misalignment, comprising the following steps:

step 1: fabricating a first polar plate and a second polar plate, wherein the first polar plate is provided with a first side and a second side; the first side is provided with a first flow channel and a first reference plane; the second side is provided with a second flow channel and a second reference plane; the first flow channel is a groove formed in a first thickness direction of the first polar plate relative to the first reference plane; the second flow channel is a groove formed in a second thickness direction of the first polar plate relative to the second reference plane; a back of a bottom of the first flow channel is a first part of the second reference plane, and a back of a bottom of the second flow channel is a first part of the first reference plane; the first thickness direction and the second thickness direction of the first polar plate are two opposite directions perpendicular to the first reference plane;

the second polar plate is provided with a third side and a fourth side; the third side is provided with a third flow channel and a third reference plane; the fourth side is provided with a fourth flow channel and a fourth reference plane; the third flow channel is a groove formed in a third thickness direction of the second polar plate relative to the third reference plane; the fourth flow channel is a groove formed in a fourth thickness direction of the second polar plate relative to the fourth reference plane; a back of a bottom of the third flow channel is a first part of the fourth reference plane, and a back of a bottom of the fourth flow channel is a first part of the third reference plane; the third thickness direction and the fourth thickness direction of the second polar plate are two opposite directions perpendicular to the third reference plane; and step 2: combining the first polar plate and the second polar plate in the following manner:

the second side of the first polar plate is attached to the fourth side of the second polar plate, a second part of the second reference plane is in contact with a second part of the fourth reference plane, or a first part of the first part of the second reference plane is in contact with a first part of the first part of the fourth reference plane, and a center of mass of the first polar plate is misaligned with a center of mass of the second polar plate;

a distance between a projection of the center of mass of the first polar plate in a fifth reference plane and a projection of the center of mass of the second polar plate in the fifth reference plane is d, and d>w/2, wherein, w represents a width of the first flow channel at a depth, wherein the depth is half of a total depth of the first flow channel;

the fifth reference plane is a virtual projection plane perpendicular to a thickness direction of the bipolar plate;

the thickness direction of the bipolar plate is consistent with the first thickness direction or the second thickness direction of the first polar plate on the bipolar plate;

a misalignment direction is defined as being parallel to a line connecting the projection of the center of mass of the first polar plate in the fifth reference plane and the projection of the center of mass of the second polar plate in the fifth reference plane step 3: fixedly connecting the first polar plate to the second polar plate, wherein the first polar plate and the second polar plate fabricated in step 1 have an identical geometric shape;

the first side of the first polar plate is the same as the third side of the second polar plate, and the second side of the first polar plate is the same as the fourth side of the second polar plate;

the first polar plate and the second polar plate are separately provided with a fuel inlet channel, a fuel outlet channel, an oxidant inlet channel and an oxidant outlet channel;

after the step of fixedly connecting the first polar plate to the second polar plate, the method further comprises the following step:

cutting an edge of the oxidant inlet channel and an edge of the oxidant outlet channel, or filling a cover plate in the fuel inlet channel and the fuel outlet channel, wherein a cross-sectional area of the oxidant inlet channel is larger than a cross-sectional area of the fuel inlet channel and a cross-sectional area of the fuel outlet channel, and a cross-sectional area of the oxidant outlet channel is larger than the cross-sectional area of the fuel inlet channel and the cross-sectional area of the fuel outlet channel.

2. The method according to claim 1, wherein in step 2, due to a misalignment of the center of mass of the first polar plate and the center of mass of the second polar plate, at least one synchronous undulation area is formed on the bipolar plate;

the at least one synchronous undulation area is a region on the bipolar plate, and a smallest dimension of the at least one synchronous undulation area in the misalignment direction is larger than 2.5 times of w;

the at least one synchronous undulation area comprises a part of the first flow channel, a part of the first part of the first reference plane, a part of the second flow channel, a second part of the first part of the second reference plane, a part of the third flow channel, a part of the first part of the third reference plane, a part of the fourth flow channel and a second part of the first part of the fourth reference plane;

the second part of the first part of the second reference plane is not in contact with the second part of the first part of the fourth reference plane in the at least one synchronous undulation area;

an angle between the first flow channel in the at least one synchronous undulation area and the misalignment direction ranges from 60° to 120°, and an angle between the third flow channel in the at least one synchronous undulation area and the misalignment direction ranges from 60° to 120°.

3. The method according to claim 1, wherein the first polar plate and the second polar plate fabricated in step 1 are provided with positioning devices for misalignment assembly, respectively;

the positioning devices are symmetrical with a centerline of the bipolar plate as a symmetry axis, wherein the centerline of the bipolar plate is parallel to the misalignment direction;

in step 2, the positioning devices are configured to determine relative positions of the first polar plate and the second polar plate.

4. The method according to claim 2, wherein a top width of each of the first flow channel, the second flow channel, the third flow channel and the fourth flow channel on the first polar plate and the second polar plate fabricated in step 1 is larger than a bottom width of each of the first flow channel, the second flow channel, the third flow channel and the fourth flow channel, respectively;

cross-sections of the first flow channel, the second flow channel, the third flow channel and the fourth flow channel are isosceles trapezoids;

a length of the at least one synchronous undulation area formed in step 2 in the misalignment direction is larger than 3.5 times of w; and in the at least one synchronous undulation area, the first polar plate is not in contact with the second polar plate.

5. A fuel cell stack, comprising at least three bipolar plates fabricated by a method for assembling a bipolar plate by integral misalignment;

the method comprising the following steps:

step 1: fabricating a first polar plate and a second polar plate, wherein the first polar plate is provided with a first side and a second side; the first side is provided with a first flow channel and a first reference plane; the second side is provided with a second flow channel and a second reference plane; the first flow channel is a groove formed in a first thickness direction of the first polar plate relative to the first reference plane; the second flow channel is a groove formed in a second thickness direction of the first polar plate relative to the second reference plane; a back of a bottom of the first flow channel is a first part of the second reference plane, and a back of a bottom of the second flow channel is a first part of the first reference plane; the first thickness direction and the second thickness direction of the first polar plate are two opposite directions perpendicular to the first reference plane;

the second polar plate is provided with a third side and a fourth side; the third side is provided with a third flow channel and a third reference plane; the fourth side is provided with a fourth flow channel and a fourth reference plane; the third flow channel is a groove formed in a third thickness direction of the second polar plate relative to the third reference plane; the fourth flow channel is a groove formed in a fourth thickness direction of the second polar plate relative to the fourth reference plane; a back of a bottom of the third flow channel is a first part of the fourth reference plane, and a back of a bottom of the fourth flow channel is a first part of the third reference plane; the third thickness direction and the fourth thickness direction of the second polar plate are two opposite directions perpendicular to the third reference plane; and step 2: combining the first polar plate and the second polar plate in the following manner:

the second side of the first polar plate is attached to the fourth side of the second polar plate. a second part of the second reference plane is in contact with a second part of the fourth reference plane, or a first part of the first part of the second reference plane is in contact with a first part of the first part of the fourth reference plane, and a center of mass of the first polar plate is misaligned with a center of mass of the second polar plate;

a distance between a projection of the center of mass of the first polar plate in a fifth reference plane and a projection of the center of mass of the second polar plate in the fifth reference plane is d, and d>w/2, wherein, w represents a width of the first flow channel at a depth, wherein the depth is half of a total depth of the first flow channel;

the fifth reference plane is a virtual projection plane perpendicular to a thickness direction of the bipolar plate;

the thickness direction of the bipolar plate is consistent with the first thickness direction or the second thickness direction of the first polar plate on the bipolar plate;

a misalignment direction is defined as being parallel to a line connecting the projection of the center of mass of the first polar plate in the fifth reference plane and the projection of the center of mass of the second polar plate in the fifth reference plane;

in the fuel cell stack, each of the first flow channels of the first polar plates assembled into the at least three bipolar plates is a fuel flow channel, and each of the third flow channels of the second polar plates assembled into the at least three bipolar plates is an oxidant flow channel;

for a first polar plate and a second polar plate clamping a same membrane electrode assembly (MEA) and belonging to two different bipolar plates of the at least three bipolar plates, the projection of the center of mass of the first polar plate in a sixth reference plane and the projection of the center of mass of the second polar plate in the sixth reference plane overlap or have a first distance smaller than d;

among the at least three bipolar plates, for the two spaced-apart bipolar plates, projections of centers of mass of two first polar plates in the sixth reference plane overlap or have a second distance smaller than d, and projections of centers of mass of two second polar plates in the sixth reference plane overlap or have a third distance smaller than d;

two MEAs and one bipolar plate are sandwiched between the two spaced-apart bipolar plates;

the sixth reference plane is a virtual projection plane perpendicular to thickness directions of the at least three bipolar plates;

among the at least three bipolar plates, one of the two bipolar plates clamping the same MEA is rotated 180° relative to the other one of the two bipolar plates around an axis parallel to the thickness direction of the bipolar plate or around an axis parallel to the misalignment direction.

6. The fuel cell stack according to claim 5, wherein the first polar plate and the second polar plate of the bipolar plate have an identical geometric shape;

the first polar plate and the second polar plate are separately provided with a fuel inlet channel, a fuel outlet channel, an oxidant inlet channel and an oxidant outlet channel;

the fuel cell stack comprises a fuel inlet channel filling rod or a fuel inlet channel filling plate;

the fuel inlet channel filling rod or the fuel inlet channel filling plate is placed in the fuel inlet channel to reduce a cross-sectional area of the fuel inlet channel;

the fuel cell stack further comprises a fuel outlet channel filling rod or a fuel outlet channel filling plate;

the fuel outlet channel filling rod or the fuel outlet channel filling plate is placed in the fuel outlet channel to reduce a cross-sectional area of the fuel outlet channel.

7. A fuel cell power generation system, comprising the fuel cell stack according to claim 5.

* * * * *